United States Patent
Baset et al.

(10) Patent No.: US 10,445,507 B2
(45) Date of Patent: Oct. 15, 2019

(54) AUTOMATED SECURITY TESTING FOR A MOBILE APPLICATION OR A BACKEND SERVER

(71) Applicant: International Business Machines Corporation, Armonk, NY (US)

(72) Inventors: Salman Abdul Baset, New York, NY (US); Julian Timothy Dolby, Bronx, NY (US); Marianna Rapoport, Waterloo (CA); Philippe Suter, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 216 days.

(21) Appl. No.: 15/274,364

(22) Filed: Sep. 23, 2016

(65) Prior Publication Data
US 2018/0089437 A1    Mar. 29, 2018

(51) Int. Cl.
G06F 21/57    (2013.01)
H04L 29/06    (2006.01)

(52) U.S. Cl.
CPC ........ *G06F 21/577* (2013.01); *H04L 63/1433* (2013.01); *G06F 2221/034* (2013.01)

(58) Field of Classification Search
CPC combination set(s) only.
See application file for complete search history.

(56) References Cited

U.S. PATENT DOCUMENTS

| | | | |
|---|---|---|---|
| 7,844,959 B2 | 11/2010 | Isard | |
| 7,984,043 B1 | 7/2011 | Waas | |
| 8,166,479 B2 | 4/2012 | Roberts et al. | |
| 8,555,385 B1 * | 10/2013 | Bhatkar | G06F 21/556 726/22 |
| 8,631,094 B1 | 1/2014 | Alpert et al. | |
| 9,552,265 B2 | 1/2017 | Saito et al. | |
| 9,697,475 B1 | 7/2017 | Subramanya et al. | |
| 2005/0256893 A1 | 11/2005 | Perry | |
| 2007/0220059 A1 | 9/2007 | Lu et al. | |
| 2008/0098375 A1 | 4/2008 | Isard | |

(Continued)

OTHER PUBLICATIONS

Kim et al., "Vulnerability detection mechanism based on open API for multi-user's convenience," 2016 International Conference on Information Networking (ICOIN) worksYear: 2016 pp. 458-462.*

(Continued)

*Primary Examiner* — Roderick Tolentino
(74) *Attorney, Agent, or Firm* — Amin, Turocy & Watson, LLP

(57) ABSTRACT

Techniques that facilitate automated security testing of one or more mobile applications and/or one or more backend servers for the one or more mobile applications are provided. In one example, a system includes an analysis component and a security component. The analysis component can analyze computer instructions of a mobile application. The analysis component can also determine an identifier pattern comprising an application programming interface for one or more server endpoints associated with the mobile application. The security component can perform a security test for a server device based on the identifier pattern for the one or more server endpoints.

19 Claims, 13 Drawing Sheets

(56) References Cited

U.S. PATENT DOCUMENTS

| | | | |
|---|---|---|---|
| 2010/0146291 A1* | 6/2010 | Anbuselvan | H04L 63/08 713/189 |
| 2010/0205673 A1* | 8/2010 | Burrell | G06F 21/54 726/25 |
| 2011/0216689 A1 | 9/2011 | Jenkins et al. | |
| 2012/0078951 A1 | 3/2012 | Hsu et al. | |
| 2012/0185936 A1* | 7/2012 | Lakshminarayanan | G06F 21/52 726/22 |
| 2012/0198555 A1* | 8/2012 | Beskrovny | G06F 21/00 726/25 |
| 2012/0222123 A1 | 8/2012 | Williams et al. | |
| 2012/0310916 A1 | 12/2012 | Abadi et al. | |
| 2013/0318613 A1* | 11/2013 | Archer | G06F 21/577 726/25 |
| 2014/0172914 A1 | 6/2014 | Elnikety et al. | |
| 2014/0359776 A1* | 12/2014 | Liu | G06F 21/577 726/25 |
| 2015/0281257 A1* | 10/2015 | Hart | H04L 63/14 726/23 |
| 2015/0288705 A1 | 10/2015 | Ligman et al. | |
| 2016/0021041 A1 | 1/2016 | Zacharias et al. | |
| 2016/0112451 A1* | 4/2016 | Jevans | H04L 63/1433 726/25 |
| 2016/0189119 A1* | 6/2016 | Bowman | G06Q 20/0453 705/39 |
| 2017/0034654 A1 | 2/2017 | Oberbeck et al. | |
| 2017/0177699 A1* | 6/2017 | Chan | G06F 16/986 |

OTHER PUBLICATIONS

Tang et al. "Multi-factor web API security for securing Mobile Cloud,"2015 12th International Conference on Fuzzy Systems and Knowledge Discovery (FSKD) Year: 2015 pp. 2163-2168.*

Kontaxis et al. "An empirical study on the security of cross-domain policies in rich internet applications." Proceedings of the Fourth European Workshop on System Security. ACM, 2011, 6 pages.

Lahteenmaki, "Scenario based security evaluation: Generic OpenFlow network." Aalto University School of Electrical Engineering, (2014), 39 pages.

Author Unknown, "Static Extraction of URLs from Android Applications," http://www.rapid7.com/products/metasploit/, Last Accessed: Aug. 24, 2016, 12 pages.

rapid7.com, "Metasploit: Put Your Defenses to the Test," Last Accessed: Aug. 29, 2016, 12 pages.

coalfire.com, "Penetration Testing Services," http://www.coalfire.com/Solutions/Coalfire-Labs/Penetration-Tests, Last Accessed: Aug. 29, 2016, 4 pages.

owasp.org, "Cross-site Scripting (XSS)," https://www.owasp.org/index.php/Cross-site_Scripting_%28XSS%29, Last Accessed: Aug. 29, 2016, 8 pages.

Mutchler, et al., "A Large-Scale Study of Mobile Web App Security," http://ieee-security.org/TC/SPW2015/MoST/papers/s2p3.pdf. Last Accessed: Aug. 29, 2016, 11 pages.

Pieczul, et al., "Discovering Emergent Norms tn Security Logs," 6th Symposium on Security Analytics and Automation, IEEE 2013, 8 pages.

Probst et al. "An Automated Approach for the Analysis of Network Access Controls in Cloud Computing Infrastructures," 1CNRS, LAAS, 7 Avenue du colonel Roche, F-31400 Toulouse, France, http://citeseerx.ist.psu.edu/viewdoc/download?doi=10.1.1.724.2534&rep=rep1&type=pdf. Last Accessed: Aug. 29, 2016, 14 pages.

Ullah, et al., "Towards Building an Automated Security Compliance Tool for the Cloud," 2013, 12th IEEE International Conference on Trust, Security and Privacy in Computing and Communications, 7 pages.

Zahid, et al., "Security of Sharded NoSQL Databases: A Comparative Analysis," 2014, Conference on Information Assurance and Cyber Security (CIACS), 8 pages.

Aurelius, Bulk Loading, Chapter 29, http://s3.thinkaurelius.com/docs/titan/0_5_4/bulk-loading_html, last accessed Aug. 2, 2016; 5 pages.

List of IBM Patents or Applications Treated as Related.

Non-Final Office Action received for U.S. Appl. No. 15/230,054 dated Sep. 21, 2018, 33 pages.

Non-Final Office Action received for U.S. Appl. No. 15/230,000 dated Nov. 2, 2018, 231 pages.

Non-Final Office Action received for U.S. Appl. No. 15/230,071 dated Jan. 14, 2019, 34 pages.

Notice of allowance received for U.S. Appl. No. 15/230,000 dated Apr. 3, 2019, 36 pages.

Notice of allowance received for U.S. Appl. No. 15/230,054 dated Apr. 2, 2019, 26 pages.

* cited by examiner

AUTOMATED SECURITY TESTING FOR A MOBILE APPLICATION OR A BACKEND SERVER

BACKGROUND

The subject disclosure relates to mobile application systems, and more specifically, to security testing for a mobile application and/or a backend server.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate automated security testing of one or more mobile applications and/or one or more backend servers for the one or more mobile applications are described.

According to an embodiment, a system can comprise a memory that stores computer executable components and a processor that executes computer executable components stored in the memory. The computer executable components can comprise an analysis component that analyzes computer instructions of a mobile application and determines an identifier pattern comprising an application programming interface for one or more server endpoints associated with the mobile application. The computer executable components can also comprise a security component that performs a security test for a server device based on the identifier pattern for the one or more server endpoints.

According to another embodiment, a computer-implemented method is provided. The computer-implemented method can comprise receiving, by a system operatively coupled to a processor, a mobile application. The computer-implemented method can also comprise analyzing, by the system, computer instructions of the mobile application. Furthermore, the computer-implemented method can comprise determining, by the system, one or more identifier patterns comprising one or more application programming interfaces for one or more server endpoints associated with the mobile application. The computer-implemented method can also comprise performing, by the system, a security test for a server device based on the one or more identifier patterns for the one or more server endpoints.

According to yet another embodiment, a computer program product for performing automated security testing of a backend server can comprise a computer readable storage medium having program instructions embodied therewith. The program instructions can be executable by a processor and cause the processor to analyze computer instructions of a mobile application. The program instructions can also cause the processor to determine an identifier pattern comprising an application programming interface for one or more server endpoints associated with the mobile application. Furthermore, the program instructions can cause the processor to modify the identifier pattern to generate a modified identifier pattern for the one or more server endpoints. The program instructions can also cause the processor to perform a security test for a server device based on the modified identifier pattern for the one or more server endpoints.

DETAILED DESCRIPTION

Figure 1:
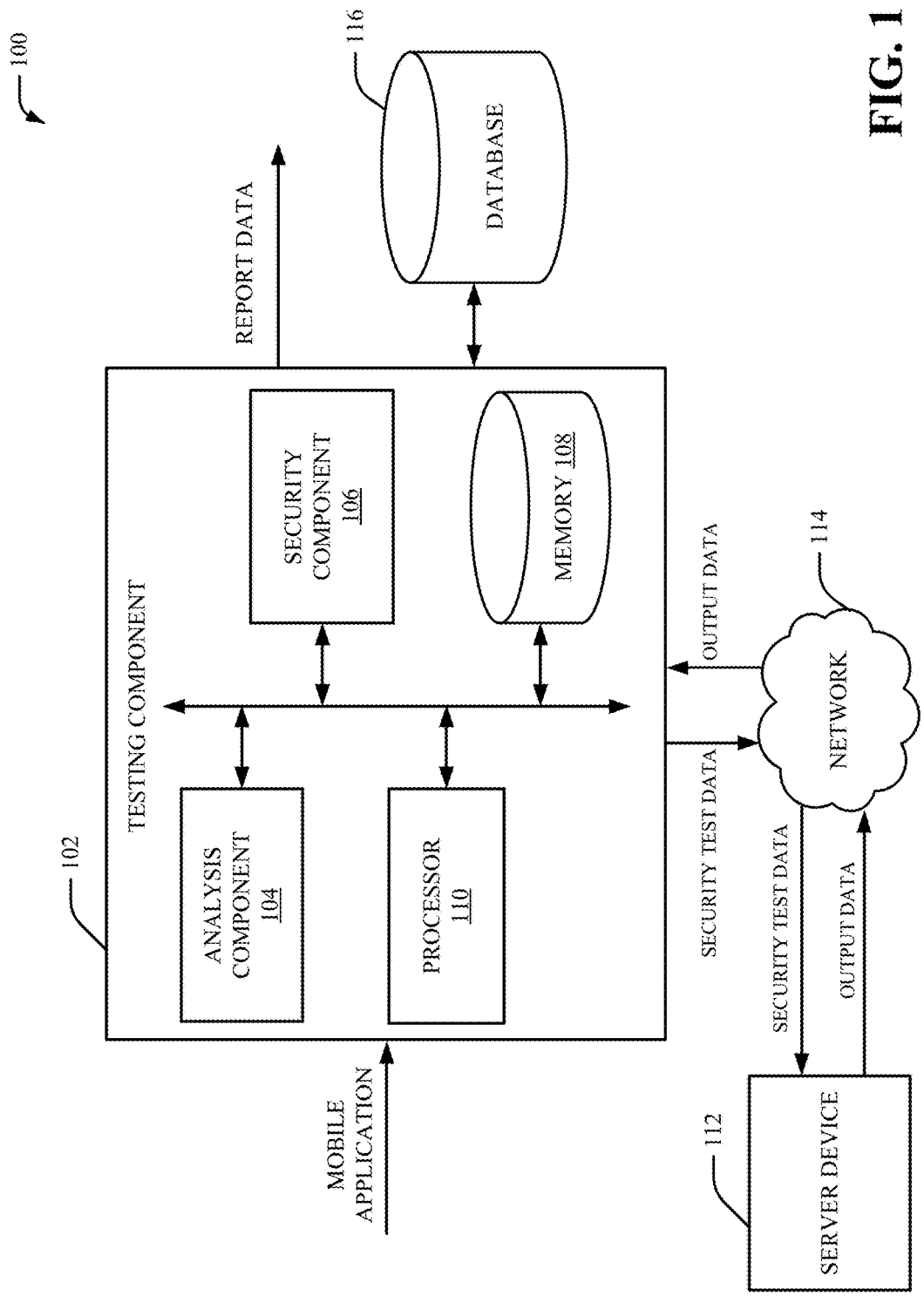
FIG. 1 illustrates a block diagram of an example, non-limiting testing component in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

There are currently millions of mobile applications available to consumers. These mobile applications are generally developed for mobile platforms of mobile electronic devices (e.g., smart phones, tablets, smart watches, etc.). Mobile applications generally rely on external resources and/or external services to provide functionality to the mobile applications. For example, a mobile application generally communicates with and/or is supported by a backend server via a network. A backend server can be, for example, a server that provides support to a mobile application without interacting with a user of the mobile application. As the number of mobile applications available to consumers increases, likelihood of these external resources and/or external services (e.g., a backend server) being exposed through the mobile applications also increases. Furthermore, mobile applications are often provided to consumers without being analyzed for security issues. Therefore, mobile applications and/or backend servers for mobile applications are often prone to security weaknesses and/or cyber attacks.

Embodiments described herein include systems, computer-implemented methods, apparatus and computer program products that facilitate automated security testing of one or more mobile applications and/or one or more backend servers associated with one or more mobile applications. As used herein, a "backend server" can be a server that is not directly accessed by a user interface of a mobile application (e.g., a user interface that is rendered on a display of a mobile electronic device).

In an aspect, computer instructions of a mobile application can be analyzed. Analysis of the computer instructions of the mobile application can include static analysis of the computer instructions where the computer instructions are analyzed without executing the computer instructions of the mobile application. Based on the analysis of the computer instructions, information regarding a backend server associated with the mobile application can be determined. For instance, a set of server endpoints associated with the mobile application can be determined. The information regarding the backend server (e.g., the set of server endpoints) can be employed during a security test process for the mobile application and/or the backend server associated with the mobile application. In one example, to facilitate the security test process, the information regarding the backend server (e.g., the set of server endpoints) can be modified. The modified information regarding the backend server can be transmitted to the backend server. Furthermore, output data generated by the backend server based on the modified information can be obtained and/or employed to generate a security report for the backend server. As such, precise information regarding security of a backend server and/or a mobile application can be obtained. Accuracy of a security test for a backend server and/or a mobile application can also be improved. Furthermore, detection of security vulnerabilities and/or security weaknesses associated with a backend server and/or a mobile application can be improved. Moreover, likelihood of a cyber attack associated with a backend server and/or a mobile application can also be minimized.

FIG. 1 illustrates a block diagram of an example, non-limiting system that facilitates automated security testing of a mobile application and/or backend server associated with a mobile application system in accordance with one or more embodiments described herein. In various embodiments, the system 100 can be a security testing system for one or more mobile applications and/or one or more backend servers associated with one or more mobile applications. Moreover, the system 100 can be associated with, employed with or included in a mobile application system, a server system, a digital distribution system, an application development system, a data center system, a simulation system, a design system, an electronic testing system and/or another type of system. The system 100 can employ hardware and/or software to solve problems that are highly technical in nature, that are not abstract and that cannot be performed as a set of mental acts by a human. Further, some of the processes performed may be performed by a specialized computer (e.g., a specialized computer with a testing component) for carrying out defined tasks related to memory operations. The system 100 and/or components of the system can be employed to solve new problems that arise through advancements in technology, employment of mobile applications, employment of backend servers for mobile applications, and/or computer architecture, and the like. One or more embodiments of the system 100 can provide technical improvements to security testing systems, mobile applications systems, mobile application systems, server systems, digital distribution systems, application development systems, data center systems, a simulation system, a design system and/or an electronic testing system by reducing security vulnerabilities of a mobile application and/or a backend server, improving accuracy of a security test for a mobile application and/or a backend server, etc. One or more embodiments of the system 100 can also provide technical improvements to a mobile electronic device associated with a mobile application by reducing security vulnerabilities of the mobile application and/or likelihood of a cyber attack with respect to the mobile electronic device.

In the embodiment shown in FIG. 1, the system 100 can include a testing component 102. As shown in FIG. 1, the testing component 102 can include an analysis component 104 and a security component 106. Aspects of the testing component 102 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the testing component 102 can also include memory 108 that stores computer executable components and instructions. Furthermore, the testing component 102 can include a processor 110 to facilitate execution of the instructions (e.g., computer executable components and corresponding instructions) by the testing component 102. As shown, the analysis component 104, the security component 106, the memory 108 and/or the processor 110 can be electrically and/or communicatively coupled to one another in one or more embodiments.

The testing component 102 can be in communication with a server device 112 via a network 114. The server device 112 can be a hardware device that includes one or more processors. The server device 112 can also be a backend server for one or more mobile applications. For example, the server device 112 can be a server that provides support to one or more mobile application without interacting with one or more users of the one or more mobile applications. The network 114 can include one or more networks. For example, the network 114 can include one or more wireless networks and/or one or more wired networks, including but not limited to, a cellular network, a wide area network (WAN, e.g., the Internet) and/or a local area network (LAN).

The testing component 102 can receive a mobile application (e.g., MOBILE APPLICATION shown in FIG. 1). The mobile application can be a software application that is designed to be executed by a mobile electronic device (e.g., a wireless computing device) such as a smart phone, a tablet, a smart watch, a computer, a smart device, a mobile device, a handheld device, a portable computing device or another type of mobile electronic device associated with a display. In various embodiments, the mobile application can also render image data and/or video data on a display of the mobile electronic device, facilitate output of audio data via at least one speaker of the mobile electronic device, facilitate input of data via a display, at least one microphone, at least one sensor and/or another input device of the mobile electronic device, facilitate other functionality associated with the mobile electronic device and/or another electronic device in communication with the mobile electronic device, etc. In one example, the mobile application can be a mobile application that is stored on the server device 112 or another server device. In another example, the mobile application can be a mobile application that is stored in a memory (e.g., a memory of the mobile electronic device, a data store, etc.). The mobile application can be in communication with the server device 112. The server device 112 can include one or more servers that provide functionality to the mobile application and/or one or more other mobile applications. The server device 112 can also be a backend server for the mobile application and/or one or more other mobile applications. For example, the server device 112 can be a server that is not directly accessed by a user interface of the mobile application (e.g., a user interface that is rendered on a display of a mobile electronic device that executes the mobile application).

The analysis component 104 can analyze computer instructions of the mobile application. In some embodiments, the computer instructions of the mobile application can be a set of (or, in some embodiments, one or more) operations performed by a processor of a mobile electronic device that executes the mobile application. Additionally or alternatively, the computer instructions of the mobile application can be a set of (or, in some embodiments, one or more) instructions executed by a processor of a mobile electronic device that executes the mobile application. In one example, the computer instructions of the mobile application can be bytecode. The bytecode can be an instruction set for the mobile application that includes numeric codes, textual data, constants and/or alphanumeric text. For example, the bytecode can be a list of instruction lines where an instruction line from the list of instruction lines includes a numeric code, textual data, one or more constants and/or alphanumeric text. In a non-limiting example, an instruction line of the bytecode can state "3: aload_0" and another instruction line of the bytecode can state "33: astore_1". The bytecode can also be different than human-readable computer instructions (e.g., human-readable source code) written using a human-readable computer language. In one example, the bytecode can be processed by a virtual machine associated with the mobile application.

The analysis component 104 can analyze the computer instructions of the mobile application during a static analysis process. In some embodiments, the static analysis process can be an analysis process where the mobile application is analyzed without executing the mobile application (e.g., without executing the computer instruction of the mobile application). For example, the analysis component 104 can analyze structure of the computer instructions and/or structural information included in the computer instructions without executing the mobile application.

In another example, the analysis component 104 can identify patterns and/or characteristics associated with the computer instructions without executing the mobile application. In an implementation, the static analysis performed by the analysis component 104 can include intra-procedural analysis of the mobile application. For instance, the analysis component 104 can perform intra-procedural analysis of the mobile application by individually analyzing a set of procedures associated with the computer instructions without executing the mobile application. In another implementation, the static analysis performed by the analysis component 104 can include inter-procedural analysis of the mobile application. For instance, the analysis component 104 can perform inter-procedural analysis of the mobile application by analyzing interactions between a set of procedures associated with the computer instructions.

The analysis component 104 can also determine one or more potential execution paths through the computer instructions. For example, the analysis component 104 can perform a data flow analysis of a sequence of characters (e.g., string concatenations) within the computer instructions. In some embodiments, the analysis component 104 can track a sequence of characters throughout the computer instructions and/or formatting of the computer instructions. Furthermore, the analysis component 104 can determine a sequence of characters in the computer instructions that satisfy a defined criterion. For instance, the analysis component 104 can identify a sequence of characters in the computer instructions that corresponds to a defined sequence of characters. The defined sequence of characters can be stored in a memory (e.g., the memory 108) and can be employed by the analysis component 104 during the analysis of the computer instructions.

The analysis component 104 can determine, based on analysis of the computer instructions by the analysis component 104, an identifier pattern for a server endpoint associated with the mobile application. At least a portion of the identifier pattern can correspond to a defined sequence of characters employed by the analysis component 104 during the analysis of the computer instructions. Furthermore, in some embodiments, the identifier pattern can be an identifier for the server endpoint. In various embodiments, a server endpoint can be an entity, processor, network device or resource associated with the server device 112 that is referenced by the mobile application. The mobile application can also be in communication with the server endpoint to access and/or receive data from the server device 112.

It is to be appreciated that the analysis component 104 can identify more than one server endpoint associated with the mobile application. For example, the server device 112 can include a plurality of server endpoints and the analysis component 104 can identify one or more server endpoints from the plurality of server endpoints. The identifier pattern can be a pattern associated with a set of web domains, a pattern associated with a set of web pages, a pattern associated with an Internet protocol (IP) address, a pattern associated with a hostname for a network device (e.g., a hostname associated with the server endpoint), a pattern associated with a network path, a pattern associated with one or more parameter (e.g., one or more query parameters) a pattern associated with a set of web addresses, or a pattern associated with textual data that is generated and/or stored in connection with the server endpoint. As such, the analysis component 104 can identify at least one of an Internet protocol address, a hostname, a network path, one or more parameters, a set of web domains, a set of web pages, a set of web addresses, or textual data associated with the server endpoint.

In an aspect, the identifier pattern can be a uniform resource location (URL) for the server endpoint. The identifier pattern can also be associated with an application programming interface (API) for the mobile application. For example, the identifier pattern can include an API. The API can be a service interface that employs web technologies. The API can include, for example, a set of subroutine definitions, a set of protocols and/or a set of tools employed to generate and/or manage the mobile application. In some embodiments, the API can also be unique to the mobile application. For example, an API for the mobile application can rely on hypertext transfer protocol (HTTP) requests (e.g., a GET command, a POST command, a DELETE command, etc.) being sent to resources identified by URLs. As such, usage of a particular API of the mobile application can be determined based on URL strings in the computer instructions of the mobile application that perform HTTP requests. Furthermore, the server device 112 can be an API backend server. The mobile application can employ at least a portion of an API provided by the server device 112.

In some embodiments, the API associated with the server device 112 can expose resources offered by the server device 112 via a Representational State Transfer (REST) network architecture. Resources offered by the server device 112 can include, for example, data or functionalities identified by URLs. For example, a REST network architecture process can include reading a designated URL page that contains a data file (e.g., an XML file) that describes and/or includes content associated with the URL page. A user interface of the mobile application can access the server endpoint and/or the content based on the URL page. For instance, the mobile application can interact with the resources offered by the server device 112 via HTTP (e.g., the mobile application can send HTTP requests to URLs associated with the resources). As such, in one example, the identifier pattern can be a HTTP REST API.

In another aspect, the identifier pattern can be associated with a hierarchical structure. In a non-limiting example, the identifier pattern can be a URL with the following hierarchical structure: "http://example.com/api/users/SMcDuck?extended=true". In this non-limiting example, "http" can represent a protocol, "example.com" can represent a domain name, "/api/users/SMcDuck" can represent a path, "extended" can represent a query parameter key, "true" can represent a query parameter value, and "extended=true" can represent a query parameter key-value pair. However, it is to be appreciated that a URL can include different portions. Furthermore, certain portions of a URL are generally static (e.g., a host and domain denoting a web API) and other portions of a URL are generally dynamic (e.g., a path parameter used to identify a specific user or a query parameter value). In an aspect, different portions of the identifier pattern can contain different information regarding a web API. From the above example, the analysis component 104 can determine that data is transferred without being encrypted since the HTTP protocol is used (e.g., rather than HTTPS). The analysis component 104 can further determine that a request to the "example.com" API is performed, that a "users" resource is invoked and identified by "SMcDuck", and that "extended" data is included in the web API. Therefore, the identifier pattern can act as a proxy that allows the analysis component 104 to infer information regarding API requests and/or other communications with the server endpoint.

In various embodiments, the server endpoint can be an entity, network device, processor or resource for an API of the mobile application. For example, a server endpoint can include a resource identified by a URL and/or can provide the resource via HTTP. As such, the identifier pattern can be a URL (e.g., a URL string) for the API of the mobile application. By extracting by extracting identifier patterns (e.g., URL strings) from the computer instructions of the mobile application, the analysis component 104 can identify a set of APIs employed by the mobile application. The analysis component 104 can analyze the server endpoint to determine whether the server endpoint is associated with a backend server for the mobile application. For instance, the analysis component 104 can analyze an IP address for the server endpoint and/or a hostname for a network device associated with the server endpoint to determine whether the server endpoint is associated with a backend server for the mobile application or a third-party web resource.

In an embodiment, the analysis component 104 can store the identifier pattern in a database 116. The database 116 can be coupled to the testing component 102. Alternatively, the testing component 102 can include the database 116. The analysis component 104 can store the identifier pattern in the database 116 with at least another identifier pattern for another server endpoint associated with the mobile application. Additionally or alternatively, the analysis component 104 can store the identifier pattern in the database 116 with at least another identifier pattern for another server endpoint associated with another mobile application. In one example, the analysis component 104 can store an identifier pattern in the database 116 in response to a determination that a server endpoint associated with the identifier pattern is employed by the mobile application (e.g., a determination that the identifier pattern is not associated with a third-party web resource).

The security component 106 can perform a security test for the server device 112 based on the identifier pattern for the server endpoint. In one example, the security component 106 can perform a penetration test for the server device 112 that involves security-oriented probing of the server device 112 based on the identifier pattern for the server endpoint. The security component 106 can also employ one or more parameters included in the identifier pattern to facilitate the penetration test for the server device 112. The security test performed by the security component 106 can test for security weaknesses of the server device 112 and/or security vulnerabilities of the server device 112.

The security component 106 can generate a modified version of the identifier pattern to facilitate the security test. For example, in some embodiments, the security component 106 can add a payload to the identifier pattern by augmenting the identifier pattern with the payload. In another example, the security component 106 can add a payload to the identifier pattern by replacing a portion of the identifier pattern with the payload. In yet another example, the security component 106 can remove a portion of the identifier pattern to create the modified version of the identifier pattern.

The security component 106 can transmit security test data (e.g., SECURITY TEST DATA shown in FIG. 1) to at least the server device 112. The security test data can be transmitted to the server device 112 via one or more data packets associated with the network 114. In one example, the security test data can be transmitted to the server device 112 via one or more encoded data packets and/or one or more compressed data packets. The security test data can include the modified version of the identifier pattern (e.g., the security component 106 can transmit the modified version of the identifier pattern to the server device 112). Additionally or alternatively, the security test data can include authentication data (e.g., the security component 106 can transmit authentication data to the server device 112). The authentication data can be, for example, an authentication token (e.g., a security token) that includes credentials for the mobile application. The server device 112 can verify the authentication data and/or authenticate the credentials included in the authentication data before processing the security test data. It is to be appreciated that the security test data can be transmitted to more than one server device and/or more than one server endpoint in response to a determination that an identifier pattern associated with the security test data is related to more than one server device and/or more than one server endpoint.

The security component 106 can also receive output data (e.g., OUTPUT DATA shown in FIG. 1) generated by the server device 112 in response to the security test data (e.g., the modified version of the identifier pattern). For example, the security component 106 can determine output data generated by the server device 112 in response to the security test data (e.g., the modified version of the identifier pattern) being processed by the server device 112. The output data can be received from the server device 112 via one or more data packets associated with the network 114. In one example, the output data can be received from the server device 112 via one or more encoded data packets and/or one or more compressed data packets. The output data can include information regarding the server device 112. For example, the output data can provide information regarding structure and/or functionality of the server device 112. Additionally or alternatively, the output data can provide information regarding the mobile application. For example, the output data can provide information regarding structure and/or functionality of the mobile application. In certain implementations, the output data can include and/or facilitate identification of one or more other server endpoints associated with the mobile application. Therefore, the analysis component 104 can initiate further analysis of the output data and/or the computer instructions to identify one or more other identifier patterns associated with the one or more other server endpoints and/or perform another security test for the server device 112.

The security component 106 can generate report data (e.g., REPORT DATA shown in FIG. 1) based on the output data generated by the server device 112. For example, the report data can include a security report for the server device 112. The security report can be in a human-readable format. The report data (e.g., the security report associated with the report data) can include information regarding one or more security weaknesses and/or likelihood of a cyber attack with respect to the server device 112. In an embodiment, the security component 106 can generate a user interface, for display, that outputs the report data in a human interpretable format. For example, the security component 106 can render a display for the report data via a display device such as a mobile electronic device, a monitor, a web browser or the like. The display for the report data can include one or more display elements associated with the report data. For example, the one or more display elements can include alphanumeric characters associated with the report data, graphical elements associated with the report data, a notification associated with the report data, a message associated with the report data, an icon associated with the report data, a thumbnail associated with the report data, a dialog box associated with the report data, a tool associated with the report data, a widget associated with the report data, a graph associated with the report data, and/or another display element associated with the report data. A display element associated with the report data can be transparent, translucent or opaque. A display element associated with the report data can also be various sizes, various colors, various brightness, and so forth as well as being animated (e.g., for fading in and out, etc.). In one example, the report data can be organized and/or presented graphically in an easily comprehensible manner. Furthermore, the report data can be static or updated dynamically to provide information in real-time as changes or events occur with respect to the security test, the mobile application and/or the server device 112.

It is to be appreciated that the analysis component 104 can analyze computer instructions (e.g., a sequence of instructions, a thread of execution) during an analysis process that cannot be performed by a human (e.g., is greater than the capability of a single human mind). For example, an amount of data processed, a speed of processing of data and/or data types processed by the analysis component 104 over a certain period of time can be greater, faster and different than an amount, speed and data type that can be processed by a single human mind over the same period of time. The analysis component 104 can also be fully operational towards performing one or more other functions (e.g., fully powered on, fully executed, etc.) while also performing the above-referenced analysis process. Moreover, an identifier pattern determined by the analysis component 104 can include information that is impossible to obtain manually by a user. For example, an amount of information included in an identifier pattern and/or a variety of information included in an identifier pattern determined by the analysis component 104 can be more complex than information obtained manually by a user. It is also to be appreciated that the security component 106 can perform a security test that cannot be performed by a human (e.g., is greater than the capability of a single human mind). For example, an amount of data processed, a speed of processing of data and/or data types processed by the security component 106 during a security test over a certain period of time can be greater, faster and different than an amount, speed and data type that can be processed by a single human mind over the same period of time. The security component 106 can also be fully operational towards performing one or more other functions (e.g., fully powered on, fully executed, etc.) while also performing the above-referenced security test.

Figure 2:
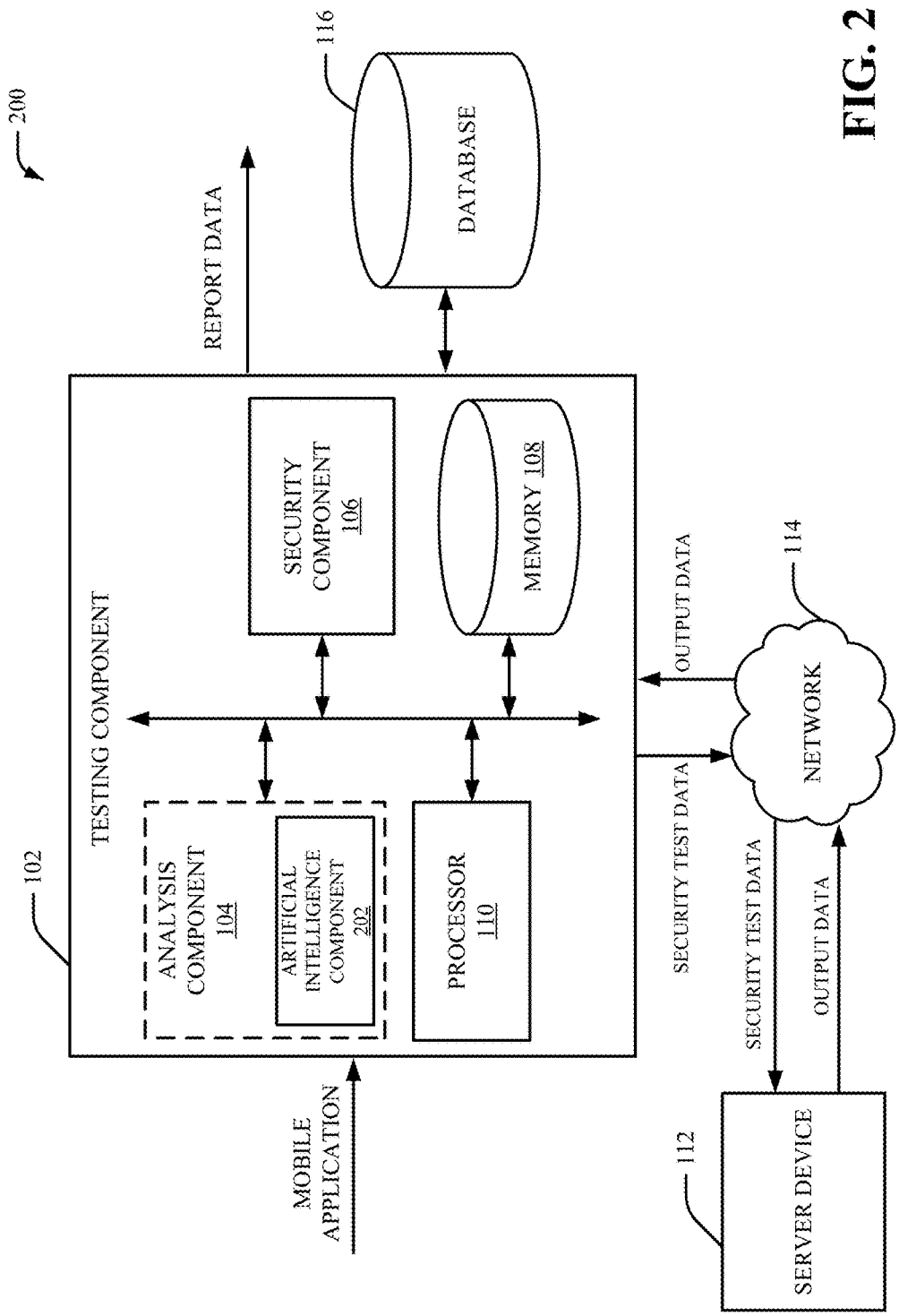
FIG. 2 illustrates a block diagram of another example, non-limiting testing in accordance with one or more embodiments described herein.

FIG. 2 illustrates another block diagram of an example, non-limiting system 200 in accordance with one or more embodiments described herein. Repetitive description of like elements employed in other embodiments described herein is omitted for sake of brevity.

In the embodiment shown in FIG. 2, the system 200 includes the testing component 102. In the embodiment shown, the testing component 102 can include the analysis component 104 and the security component 106. The analysis component 104 can include an artificial intelligence component 202.

The analysis component 104 can employ the artificial intelligence component 202 to perform analysis of the mobile application (e.g., computer instructions of the mobile application) and/or the server endpoint. For example, the analysis component 104 can extract information indicative of correlations, inferences and/or expressions from the computer instructions of the mobile application based on principles of artificial intelligence associated with the artificial intelligence component 202. In an aspect, the artificial intelligence component 202 can perform learning with respect to the mobile application (e.g., computer instructions of the mobile application) and/or the server endpoint explicitly or implicitly. The artificial intelligence component 202 can also employ an automatic classification system and/or an automatic classification process to facilitate analysis of the mobile application (e.g., computer instructions of the mobile application) and/or the server endpoint. For example, the artificial intelligence component 202 can employ a probabilistic and/or statistical-based analysis (e.g., factoring into the analysis utilities and costs) to learn and/or generate inferences with respect to the computer instructions of the mobile application. The artificial intelligence component 202 can employ, for example, a support vector machine (SVM) classifier to learn and/or generate inferences for the computer instructions of the mobile application. Additionally or alternatively, the artificial intelligence component 202 can employ other classification techniques associated with Bayesian networks, decision trees and/or probabilistic classification models. Classifiers employed by the artificial intelligence component 202 can be explicitly trained (e.g., via a generic training data) as well as implicitly trained (e.g., via receiving extrinsic information). For example, with respect to SVM's, SVM's can be configured via a learning or training phase within a classifier constructor and feature selection module. A classifier can be a function that maps an input attribute vector, $x=(x1, x2, x3, x4, xn)$, to a confidence that the input belongs to a class—that is, $f(x)=$confidence (class).

In an aspect, the artificial intelligence component 202 can include an inference component (not shown) that can further enhance automated aspects of the artificial intelligence component 202 utilizing in part inference based schemes to facilitate learning and/or generating inferences for the mobile application (e.g., computer instructions of the mobile application) and/or the server endpoint. The artificial intelligence component 202 can employ any suitable machine-learning based techniques, statistical-based techniques and/or probabilistic-based techniques. For example, the artificial intelligence component 202 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the artificial intelligence component 202 can perform a set of machine learning computations associated with analysis of the mobile application (e.g., computer instructions of the mobile application) and/or the server endpoint. For example, the artificial intelligence component 202 can perform a set of clustering machine learning computations, a set of decision tree machine learning computations, a set of instance-based machine learning computations, a set of regression machine learning computations, a set of regularization machine learning computations, a set of rule learning machine learning computations, a set of Bayesian machine learning computations, a set of deep Boltzmann machine computations, a set of deep belief network computations, a set of convolution neural network computations, a set of stacked auto-encoder computations and/or a set of different machine learning computations.

Figure 3:
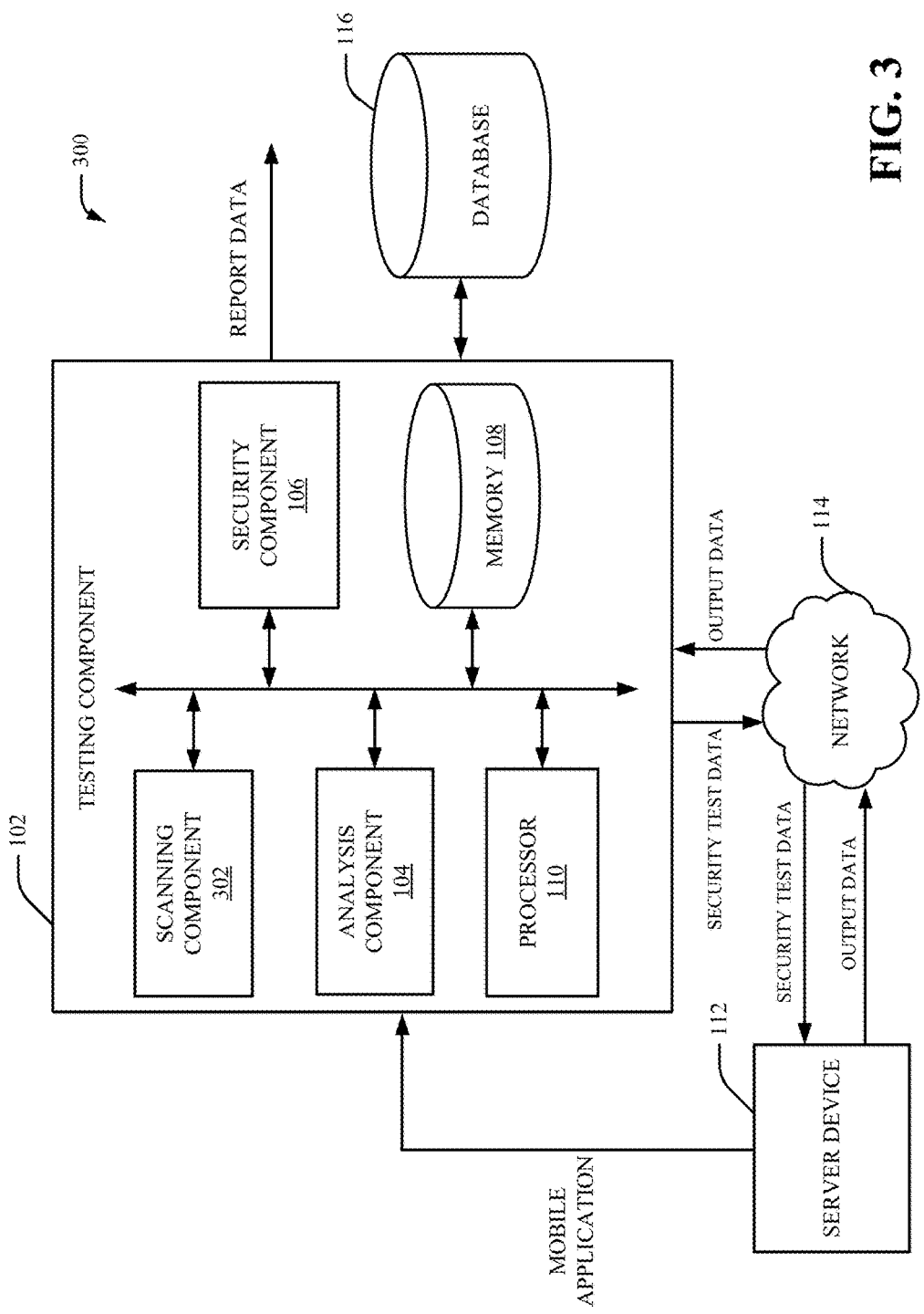
FIG. 3 illustrates a block diagram of an example, non-limiting system that facilitates automated security testing in accordance with one or more embodiments described herein.

FIG. 3 illustrates another block diagram of an example, non-limiting system 300 in accordance with one or more embodiments described herein. Repetitive description of like elements employed in other embodiments described herein is omitted for sake of brevity.

The system 300 includes the testing component 102. In the embodiment shown in FIG. 3, the testing component 102 can include the analysis component 104, the security component 106 and a scanning component 302. In certain embodiments, the analysis component 104 can include the artificial intelligence component 202.

The scanning component 302 can scan the server device 112 to determine one or more mobile applications stored on the server device 112 that satisfy a defined criterion. For example, in the embodiment shown in FIG. 3, the testing component 102 can receive the mobile application from the server device 112 in response to a determination, based on a scan of the server device 112 by the scanning component 302, that the mobile application satisfies a defined criterion. In an aspect, the scanning component 302 can scan the server device 112 to determine one or more mobile applications stored on the server device 112 that include and/or are associated with one or more defined APIs. For example, the testing component 102 can receive the mobile application from the server device 112 in response to a determination, based on a scan of the server device 112 by the scanning component 302, that the mobile application includes and/or is associated with a defined API. In another aspect, the scanning component 302 can scan the server device 112 to identify one or more mobile applications stored on the server device 112 that are determined to communicate with a certain server device. For instance, the testing component 102 can receive the mobile application from the server device 112 in response to a determination, based on a scan of the server device 112 by the scanning component 302, that the mobile application communicates with the server device 112.

Additionally or alternatively, the scanning component 302 can scan the server device 112 to determine one or more mobile applications stored on the server device 112 that satisfy other defined criterion related to, for example, an amount of time that a mobile application is stored on the server device 112, a determination that a change has occurred with respect to a mobile application (e.g., a mobile application is updated to a new version), an amount of time since a previous analysis of a mobile application is performed, a determination that a mobile application is not previously analyzed by the testing component 102, an indication that is provided via user input (e.g., a user desires a mobile application to be analyzed by the testing component 102), debugging reports for a mobile application, etc. For example, the testing component 102 can receive the mobile application from the server device 112 in response to a determination, based on a scan of the server device 112 by the scanning component 302, that an amount of time that the mobile application is stored on the server device 112 satisfies a defined criterion, that a change has occurred with respect to the mobile application (e.g., the mobile application is updated to a new version), that an amount of time since a previous analysis of the mobile application satisfies a defined criterion, that the mobile application is not previously analyzed by the testing component 102 at a previous instance in time, that an indication provided by user input indicates to analyze the mobile application, that a debugging report for the mobile application satisfies a defined criterion, etc. It is to be appreciated that, in certain implementations, the mobile application received from the server device 112 can be received via a network (e.g., the network 114 or another network that includes one or more wireless networks and/or one or more wired networks). Additionally, it is to be appreciated that, in an embodiment the testing component 102 can receive the mobile application from a server device that is different than the server device 112.

Figure 4:
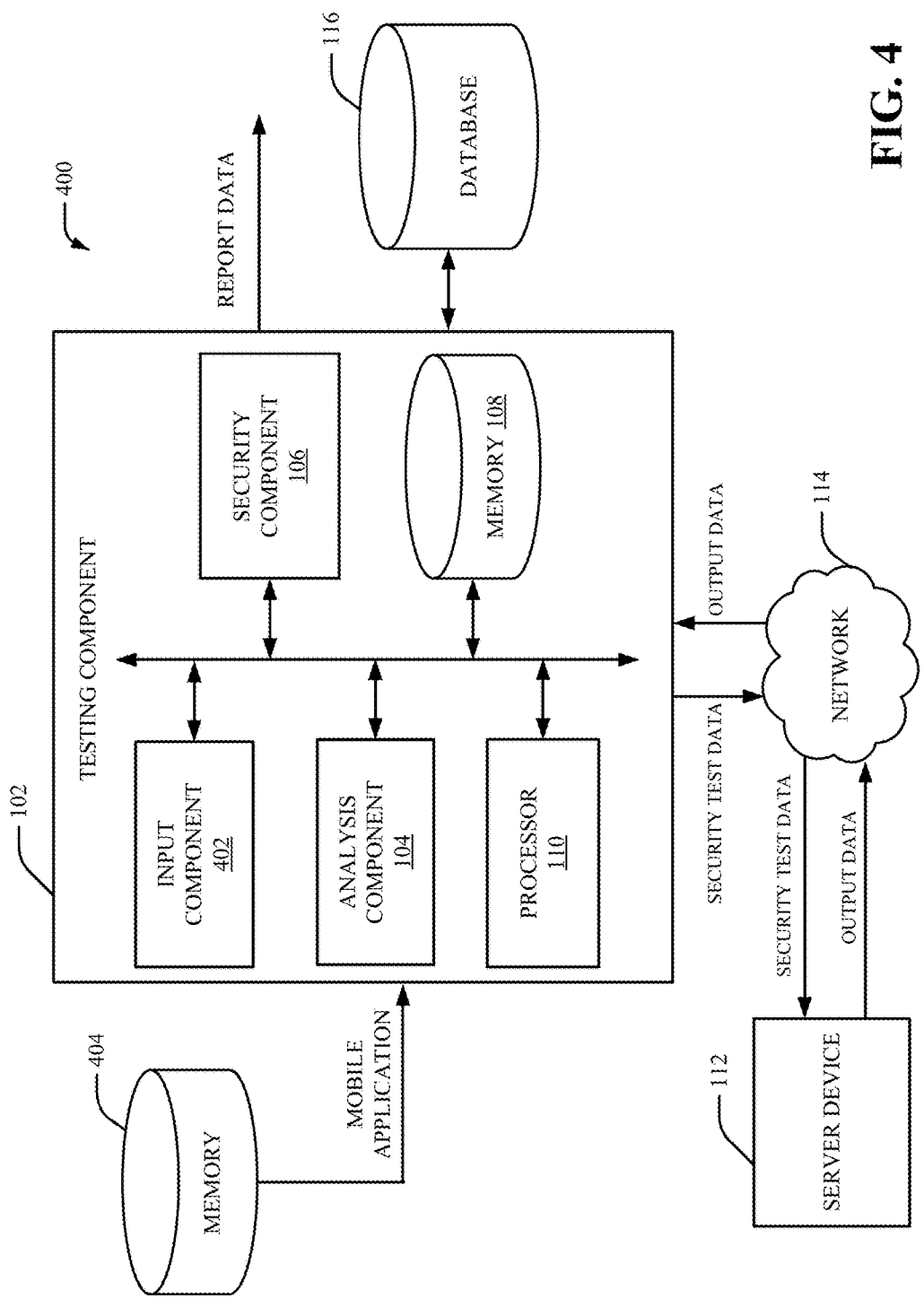
FIG. 4 illustrates a block diagram of another example, non-limiting system that facilitates automated security testing in accordance with one or more embodiments described herein.

FIG. 4 illustrates another block diagram of an example, non-limiting system 400 in accordance with one or more embodiments described herein. Repetitive description of like elements employed in other embodiments described herein is omitted for sake of brevity.

The system 400 includes the testing component 102. In the embodiment shown in FIG. 4, the testing component 102 can include the analysis component 104, the security component 106 and an input component 402. In certain embodiments, the analysis component 104 can include the artificial intelligence component 202.

In the embodiment shown in FIG. 4, the testing component 102 can receive the mobile application from a memory 404. In an embodiment, the memory 404 can be a data store that stores the mobile application and, in certain implementations, one or more other mobile applications. The memory 404 can also be a data queue that stores mobile applications to be analyzed by the testing component 102. In one example, mobile applications stored in the memory 404 can be mobile applications selected by a user via an electronic device. In another example, mobile applications stored in the memory 404 can be mobile applications selected by an electronic device. Additionally or alternatively, the mobile applications stored in the memory 404 can be mobile applications determined to satisfy a defined criterion (e.g., a defined criterion mentioned above with respect to the scanning component 302). In another embodiment, the memory 404 can be a memory of a mobile electronic device. For example, at least the mobile application can be stored on the mobile electronic device. In yet another embodiment, mobile applications identified by the scanning component 302 can be stored in the memory 404 before being analyzed by the analysis component 104. It is to be appreciated that, in certain implementations, the mobile application received from the memory 404 can be received via a network (e.g., the network 114 or another network that includes one or more wireless networks and/or one or more wired networks).

Figure 5:
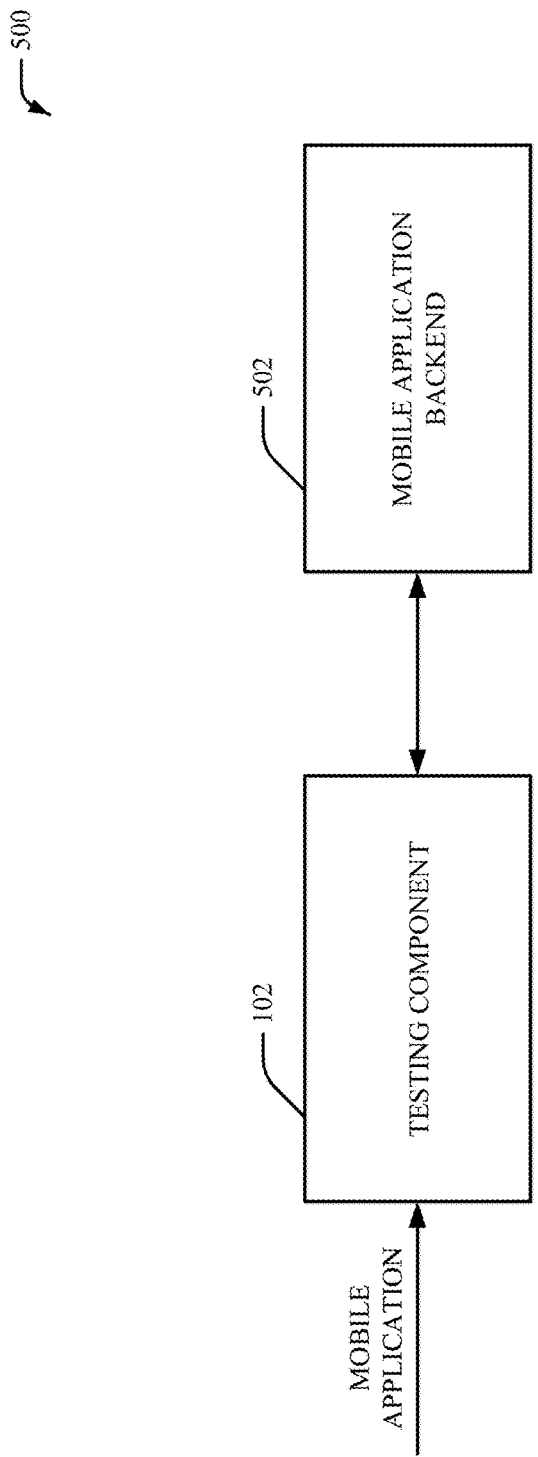
FIG. 5 illustrates an example, non-limiting diagram of a testing component and a mobile application backend in accordance with one or more embodiments described herein.

FIG. 5 illustrates another block diagram of an example, non-limiting system 500 in accordance with one or more embodiments described herein. Repetitive description of like elements employed in other embodiments described herein is omitted for sake of brevity.

The system 500 includes the testing component 102 and a mobile application backend 502. For example, the mobile application backend 502 can correspond to the server device 112. The testing component 102 can include at least the analysis component 104 and the security component 106. Furthermore, the testing component 102 can be in communication with at least the mobile application backend 502.

The testing component 102 can receive the mobile application. In an aspect, the testing component 102 (e.g., the analysis component 104) can perform static analysis with respect to computer instructions of the mobile application to determine one or more identifier patterns (e.g., one or more URL patterns) associated with the computer instructions of the mobile application. The one or more identifier patterns determined by the testing component 102 (e.g., the analysis component 104) can be one or more identifier patterns that satisfy a defined criterion. For example, the one or more identifier patterns determined by the testing component 102 (e.g., the analysis component 104) can include a defined sequence of characters and/or a defined structure. As such, the testing component 102 (e.g., the analysis component 104) can ignore (e.g., withhold from storing in the database 116) one or more identifier patterns in the computer instructions that do not satisfy the defined criterion. In a non-limiting example, an example identifier pattern (e.g., an example URL pattern) determined by the testing component 102 can be "http://getHost( ):?key1=getValue( )". The testing component 102 (e.g., the analysis component 104) can also identify one or more server endpoints relevant to the mobile application. For example, the testing component 102 (e.g., the analysis component 104) can also identify one or more IP addresses employed by the mobile application.

In another aspect, the testing component 102 (e.g., the security component 106) can generate one or more modified versions of the one or more identifier patterns determined by the testing component 102 (e.g., the analysis component 104). The one or more modified versions of the one or more identifier patterns can be security test data for transmission to the mobile application backend 502. In a non-limiting example, the example identifier pattern "http://getHost( )?key1=getValue( )" can be modified by the testing component 102 (e.g., the security component 106) to generate an example modified identifier pattern "http://getHost( )?key1=<script>securitytest</script>" for transmission to the mobile application backend 502. For example, the portion "<script>securitytest</script>" of the example, modified identifier pattern can be a payload that is added to the example identifier pattern (e.g., a payload that replaces the "getValue( )" portion of the example identifier pattern). The testing component 102 (e.g., the security component 106) can also collect output data generated by the mobile application backend 502 in response to receiving the one or more modified versions of the one or more identifier patterns. Based on the output data generated by the mobile application backend 502, the testing component 102 (e.g., the security component 106) can generate one or more reports for the mobile application backend 502 that provide information regarding security weaknesses of the mobile application backend 502 and/or likelihood of cyber attacks being successfully executed on the mobile application backend 502. It is to be appreciated that, in certain implementations, the mobile application and/or an identifier pattern for the mobile application can be associated with more than one mobile application backend. Therefore, in certain implementations, the testing component 102 can transmit security test data associated with the mobile application to more than one mobile application backend.

Figure 6:
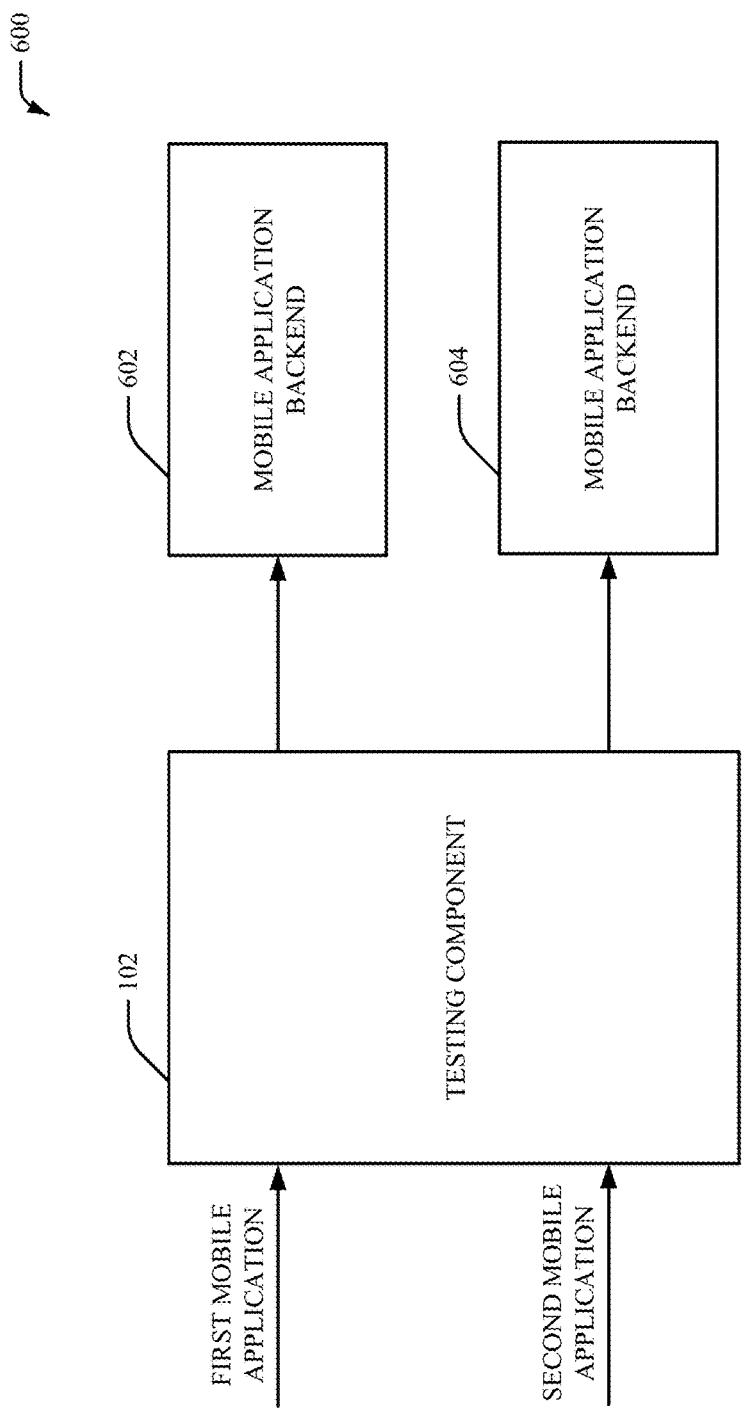
FIG. 6 illustrates an example, non-limiting diagram of a testing component and multiple mobile application backends in accordance with one or more embodiments described herein.

FIG. 6 illustrates another block diagram of an example, non-limiting system 600 in accordance with one or more embodiments described herein. Repetitive description of like elements employed in other embodiments described herein is omitted for sake of brevity.

The system 600 includes the testing component 102, a mobile application backend 602 and mobile application backend 604. For example, the mobile application backend 602 can be a first mobile application backend and the mobile application backend 604 can be a second mobile application backend (e.g., the mobile application backend 602 can be a first server device and the mobile application backend 604 can be a second server device). In another example, the mobile application backend 602 and the mobile application backend 604 can be a corresponding mobile application backend (e.g., the mobile application backend 602 can be a first server endpoint of a server device and the mobile application backend 604 can be a second server endpoint of the server device). The testing component 102 can include at least the analysis component 104 and the security component 106. Furthermore, the testing component 102 can be in communication with at least the mobile application backend 602 and the mobile application backend 604. The testing component 102 can receive a first mobile application and a second mobile application. However, it is to be appreciated that the testing component 102 can receive more than two mobile applications. Furthermore, it is to be appreciated that the testing component 102 can be in communication with more than two mobile application backends. The mobile application backend 602 can be a custom backend server for the first mobile application and the mobile application backend 604 can be a custom backend server for the second mobile application. Furthermore, the mobile application backend 602 can be exposed to the testing component 102 via a first HTTP REST API associated with the first mobile application, and the mobile application backend 604 can be exposed to the testing component 102 via a second HTTP REST API associated with the second mobile application. For example, the first mobile application can communicate with the mobile application backend 602 via a first identifier pattern (e.g., "GET api.myapp1.com?user=value") and the second mobile application can communicate with the mobile application backend 604 via a second identifier pattern (e.g., "POST service3.com/api/getprices").

The testing component 102 (e.g., the analysis component 104) can perform static analysis with respect to first computer instructions of the first mobile application to determine the first identifier pattern (e.g., "GET api.myapp1.com?user=value"). Furthermore, the testing component 102 (e.g., the analysis component 104) can perform static analysis with respect to second computer instructions of the second mobile application to determine the second identifier pattern (e.g., "POST service3.com/api/getprices"). The testing component 102 (e.g., the security component 106) can also generate a modified version of the first identifier pattern associated with the first mobile application and a modified version of the second identifier pattern associated with the first mobile application. For example, the testing component 102 (e.g., the security component 106) can augment the first identifier pattern with a first payload and the testing component 102 (e.g., the security component 106) can augment the second identifier pattern with a second payload. In another example, the testing component 102 (e.g., the security component 106) can replace a portion of the first identifier pattern with the first payload and the testing component 102 (e.g., the security component 106) can replace a portion of the second identifier pattern with the second payload. The first payload can be different than the second payload. Alternatively, the first payload can correspond to the second payload. In yet another example, the testing component 102 (e.g., the security component 106) can remove a portion of the first identifier pattern and another portion of the second identifier pattern.

Figure 7:
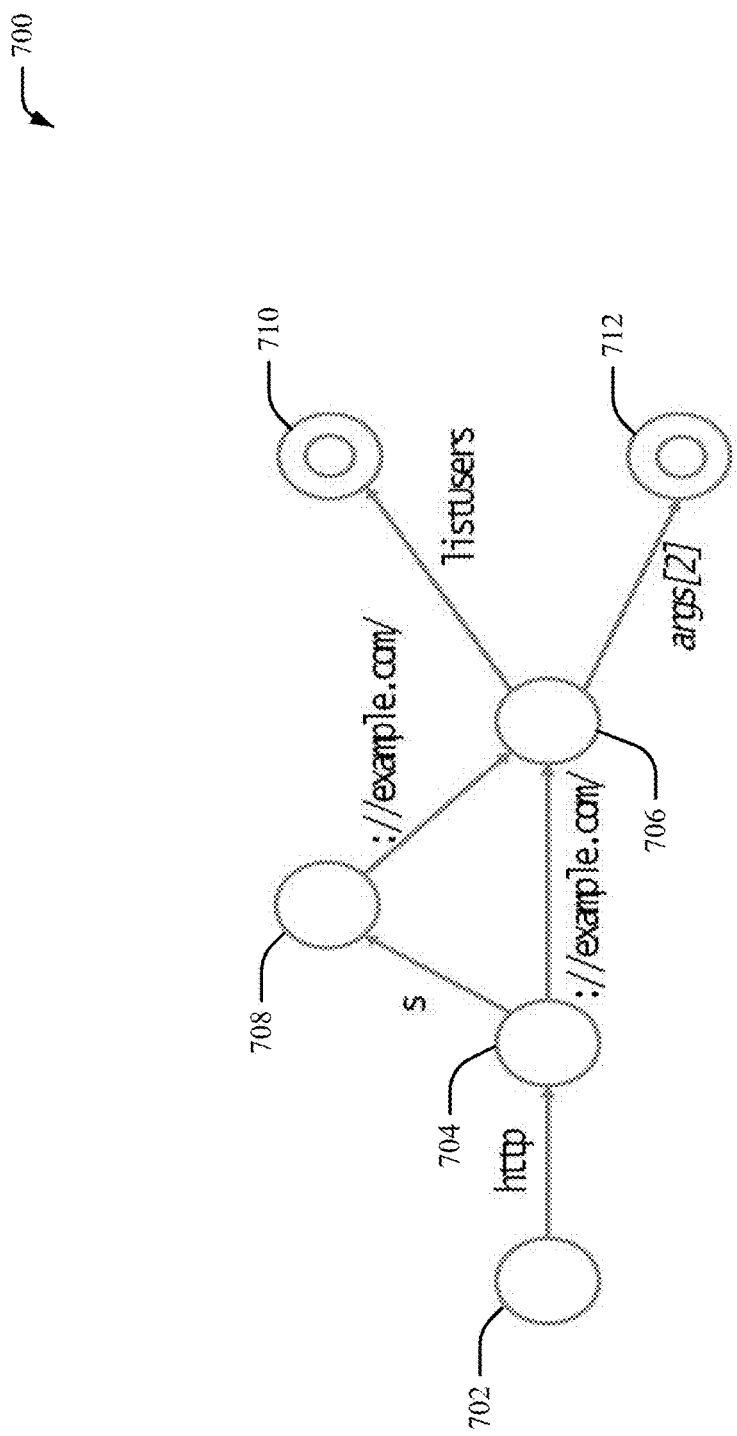
FIG. 7 illustrates an example static analysis process in accordance with one or more embodiments described herein.

FIG. 7 illustrates another block diagram of an example, non-limiting system 700 in accordance with one or more embodiments described herein. Repetitive description of like elements employed in other embodiments described herein is omitted for sake of brevity.

The system 700 is associated with the analysis component 104. For example, the system 700 can illustrate an example static analysis process performed by the analysis component 104. In an aspect, the system 700 can be a finite state machine that includes a first state 702, a second state 704, a third state 706, a fourth state 708, a fifth state 710 and a sixth state 712. At the first state 702, analysis of a sequence of characters included in computer instructions for a mobile application is started. During the analysis, it can be determined that the sequence of characters includes an "http" protocol portion that identifies the sequence of characters as a potential identifier pattern (e.g., a potential URL pattern). At the second state 704, next character(s) in the sequence of characters can be determined. If next character(s) in the sequence of characters represents a domain name (e.g., "://example.com/"), then the finite state machine can proceed to the third state 706. However, if next character(s) in the sequence of characters do not represents a domain name (e.g., a next character is "s"), the finite state machine can proceed to the fourth state 708 that identifies the sequence of characters as a secure communication protocol (e.g., an "haps" protocol). The fourth state 708 can also determine that next character(s) in the sequence of characters represents a domain name (e.g., "://example.com/"), and the finite state machine can proceed to the third state 706. The domain name can be associated with a server device and/or a server endpoint. At the third state 706, next character(s) in the sequence of characters can be determined. If it is determined that next character(s) in the sequence of characters represents a path portion "listusers", the finite state machine can proceed to the fifth state 710. For example, the path portion "listusers" can be a command to list users currently employing services provided by the domain name (e.g., services provided by a server device). If it is determined that next character(s) in the sequence of characters represents a placeholder portion "args[2]", the finite state machine can proceed to the sixth state 712. For example, the placeholder portion "args[2]" can be a value for the sequence of instructions that is not determined statically. In one example, the placeholder portion "args[2]" can be a value that is determined based on user input associated with the mobile application and/or a mobile electronic device that executes the mobile application. At the fifth state 710, an identifier pattern (e.g., a URL pattern) can be provided. For example, the fifth state 710 can provide an identifier pattern such as, for example, "http://example.com/listUsers" or "https://example.com/listUsers". At the sixth state 712, another identifier pattern (e.g., a URL pattern) can be provided. For example, the sixth state 712 can provide an identifier pattern such as, for example, "http://example.com/[ ]" or "https://example.com/[ ]". The security component 106 can employ the identifier pattern provided by the fifth state 710 or the sixth state 712 to generate a modified identifier pattern and/or to perform a security test for a server device associated with the identifier pattern provided by the fifth state 710 or the sixth state 712.

Figure 8:
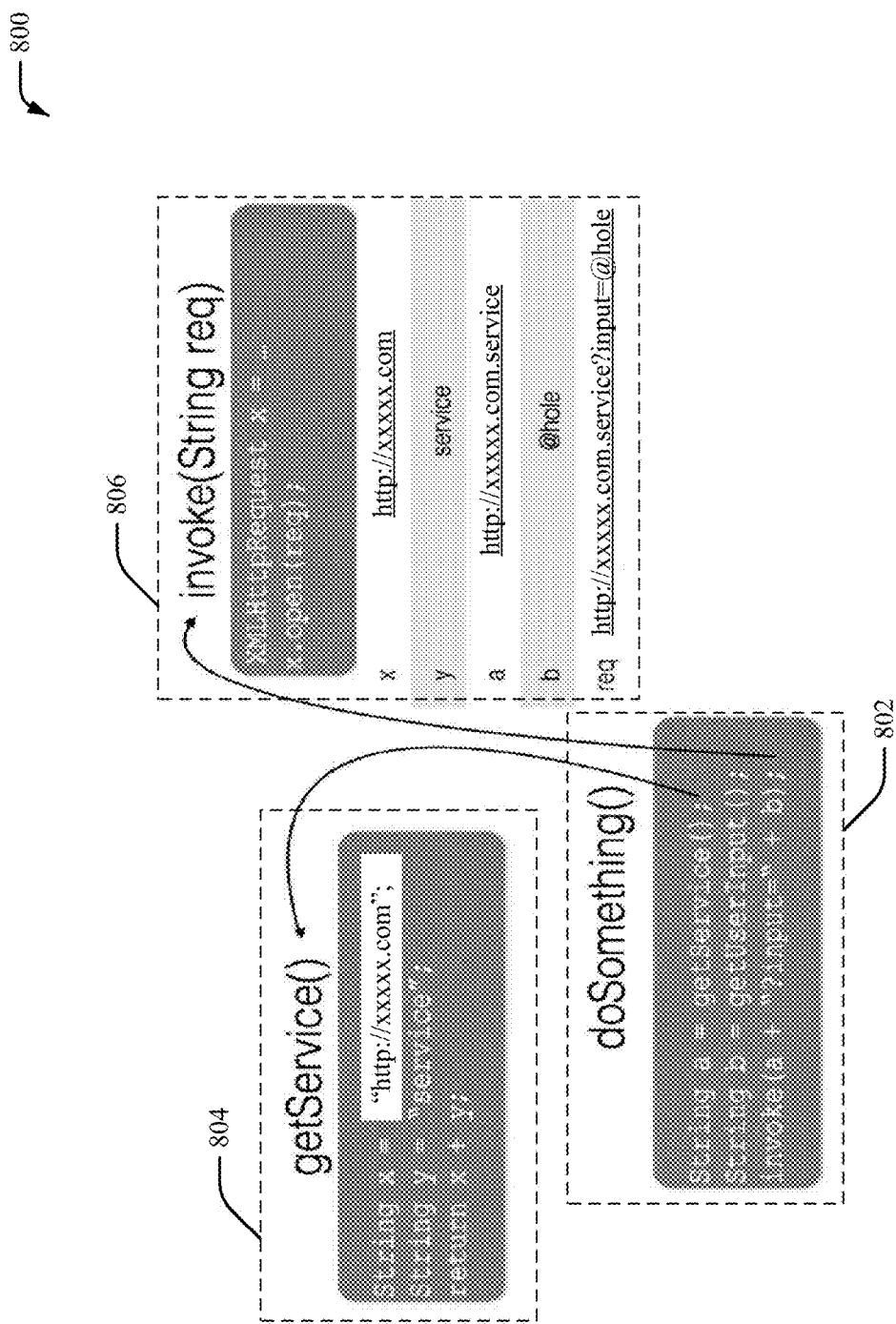
FIG. 8 illustrates an example inter-procedural analysis process in accordance with one or more embodiments described herein.

FIG. 8 illustrates another block diagram of an example, non-limiting system 800 in accordance with one or more embodiments described herein. Repetitive description of like elements employed in other embodiments described herein is omitted for sake of brevity.

The system 800 is associated with the analysis component 104. For example, the system 800 can illustrate construction of patterns during an example inter-procedural analysis process performed by the analysis component 104. The inter-procedural analysis process can be a process where a set of procedures associated with computer instructions can be individually analyzed by the analysis component 104.

The analysis component 104 can analyze a sequence of characters (e.g., a string) in computer instructions for a mobile application to follow data flow of constants throughout the computer instructions. For example, the analysis component 104 can perform a first analysis process 802 for a first sequence of characters included in computer instructions for a mobile application. The first analysis process 802 can be associated with computer instructions (e.g., bytecode) that is stored locally by a mobile application. In one example, during the first analysis process 802, the analysis component 104 can identify a first string (e.g., string a that corresponds to "getService( )") and a second string (e.g., string b that corresponds to "getUserInput( )"). During the first analysis process 802, the analysis component 104 can also determine that a certain command (e.g., "?input=") is associated with the first string and/or the second string. The first string can be a first computer function and the second string can be a second computer function. In addition to the first analysis process 802, the analysis component 104 can perform a second analysis process 804 and/or a third analysis process 806 based on the first analysis process 802. During the second analysis process 804 and/or a third analysis process 806, the analysis component 104 can determine one or more other strings (e.g., one or more other computer functions). For example, during the second analysis process 804, the analysis component 104 can determine a third string (e.g., string x that corresponds to "http://xxxxx.com") and a fourth string (e.g., string y that corresponds to "service") that are associated with the first string (e.g., string a that corresponds to "getService( )").

Additionally or alternatively, during the third analysis process 806, the analysis component 104 can invoke a fifth string (e.g., string req) that comprises an identifier pattern (e.g., a URL pattern that corresponds to "http://xxxxx.com.service?input=@hole") associated with the first string, the second string, the third string and/or the fourth string. In one example, the second string can be associated with a placeholder portion of the identifier portion. For example, the second string can be associated with a value for the identifier portion that is not determined statically (e.g., a portion of the identifier pattern that is determined based on user input associated with a mobile application and/or a mobile electronic device that executes a mobile application). In an aspect, the security component 106 can employ the identifier pattern determined based on the third analysis process 806 to generate a modified identifier pattern and/or to perform a security test for a server device associated with the identifier pattern determined based on the third analysis process 806.

Figure 9:
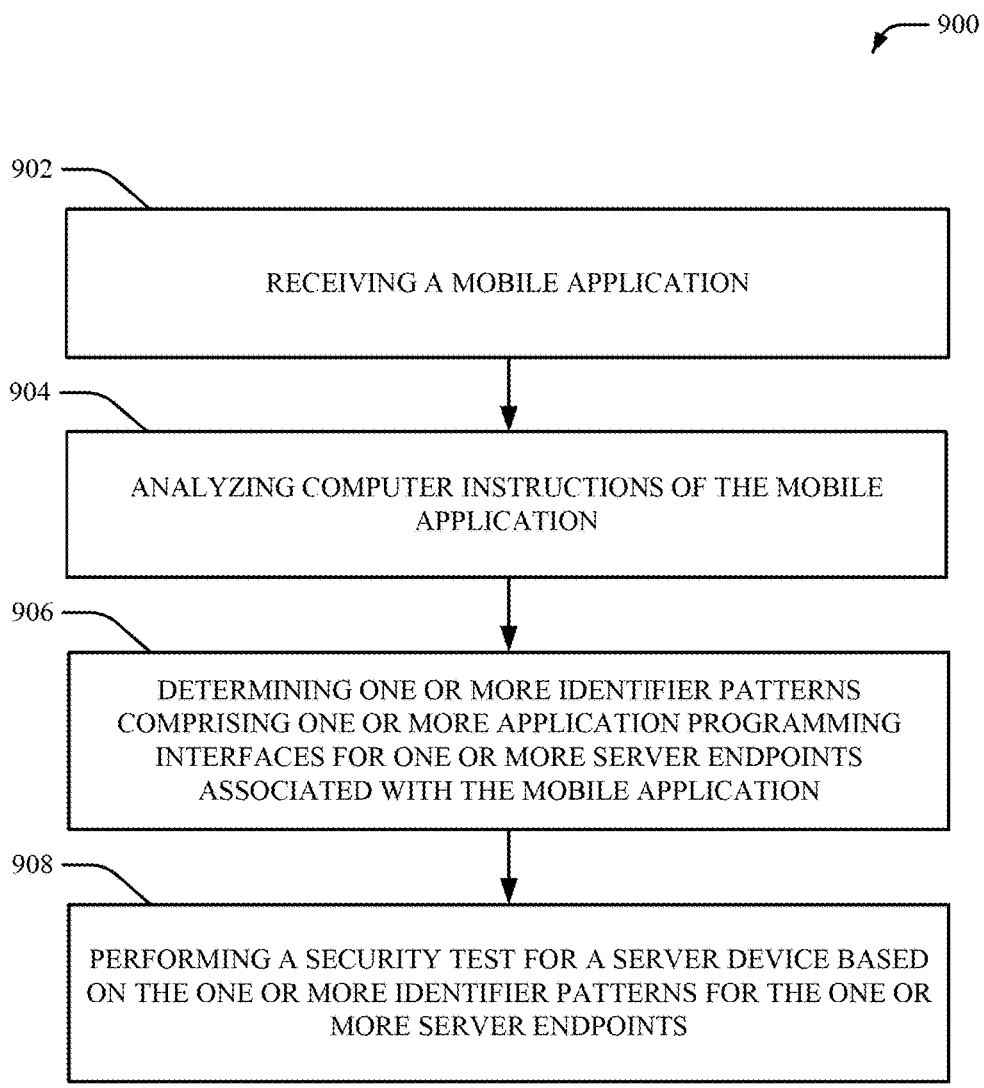
FIG. 9 illustrates a flow diagram of an example, non-limiting computer-implemented method that facilitates automated security testing in accordance with one or more embodiments described herein.

FIG. 9 illustrates a flow diagram of an example, non-limiting computer-implemented method 900 that facilitates automated security testing in accordance with one or more embodiments described herein. At 902, a mobile application is received (e.g., by analysis component 104). For example, the mobile application can be received from a server. Alternatively, the mobile application can be received from a memory (e.g., a data store). The mobile application can be software application that is designed to be executed by a mobile electronic device (e.g., a wireless computing device) such as a smartphone, a tablet, a smartwatch, a computer, a smart device, a mobile device, a handheld device, a portable computing device or another type of mobile electronic device associated with a display. The mobile application can also be in communication with the server device and/or can receive data from the server device. For example, one or more APIs of the mobile application can be implemented based on functionality and/or processes performed by the server device. The server device can be, for example, a backend server.

At 904, computer instructions of the mobile application are analyzed (e.g., by analysis component 104). For example, the computer instructions of the mobile application can be a set of operations performed by a processor of a mobile electronic device that executes the mobile application. In one example, the computer instructions of the mobile application can be bytecode that is different than human-readable computer instructions (e.g., human-readable source code) written using a human-readable computer language. In an aspect, the mobile application can be analyzed via a static analysis process (e.g., via intra-procedural analysis of the computer instructions and/or inter-procedural analysis of the computer instructions).

At 906, one or more identifier patterns comprising one or more application programming interfaces for one or more server endpoints associated with the mobile application are determined (e.g., by analysis component 104). A server endpoint from the one or more server endpoints can be an entity, processor or resource associated with the server device. A server endpoint the one or more server endpoints can also be referenced by the mobile application. For example, a server endpoint the one or more server endpoints can be referenced by the computer instructions of the mobile application. An identifier pattern from the one or more identifier patterns can be, for example, a URL pattern.

At 908, a security test for a server device is performed (e.g., by security component 106) based on the one or more identifier patterns for the one or more server endpoints. For example, penetration testing of the sever device can be performed based on the one or more identifier patterns to identify one or more security weaknesses of the server device. The server device can be associated with the one or more server endpoints. Furthermore, the server device can be in communication with the mobile application. For example, the server device can include one or more servers that provide functionality to the mobile application. The server device can also be a backend server for the mobile application. For instance, the server device can be a server that is not directly accessed by a user interface of the mobile application (e.g., a user interface that is rendered on a display of a mobile electronic device that executes the mobile application).

Figure 10:
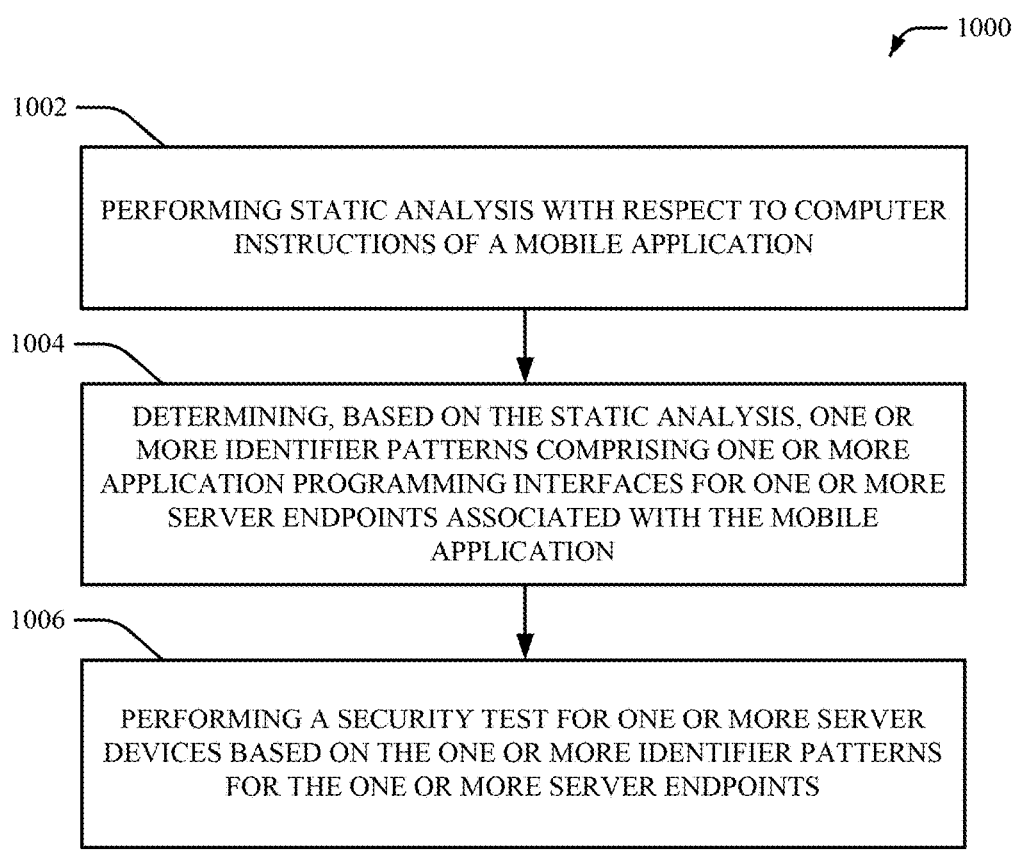
FIG. 10 illustrates a flow diagram of an example, non-limiting computer-implemented method that performs static analysis to facilitate automated security testing in accordance with one or more embodiments described herein.

FIG. 10 illustrates a flow diagram of an example, non-limiting computer-implemented method 1000 that performs static analysis to facilitate automated security testing in accordance with one or more embodiments described herein. At 1002, static analysis with respect to computer instructions of a mobile application is performed (e.g., by analysis component 104). For example, the computer instructions of the mobile application can be analyzed without executing the computer instructions. In an aspect, structure of the computer instructions and/or structural information included in the computer instructions can be analyzed via the static analysis. In another aspect, patterns and/or characteristics associated with the computer instructions can be identified via the static analysis. At 1004, one or more identifier patterns comprising one or more application programming interfaces for one or more server endpoints associated with the mobile application are determined (e.g., by analysis component 104) based on the static analysis. At 1006, a security test for the server device is performed (e.g., by security component 106) based on the one or more identifier patterns for the one or more server endpoints.

Figure 11:
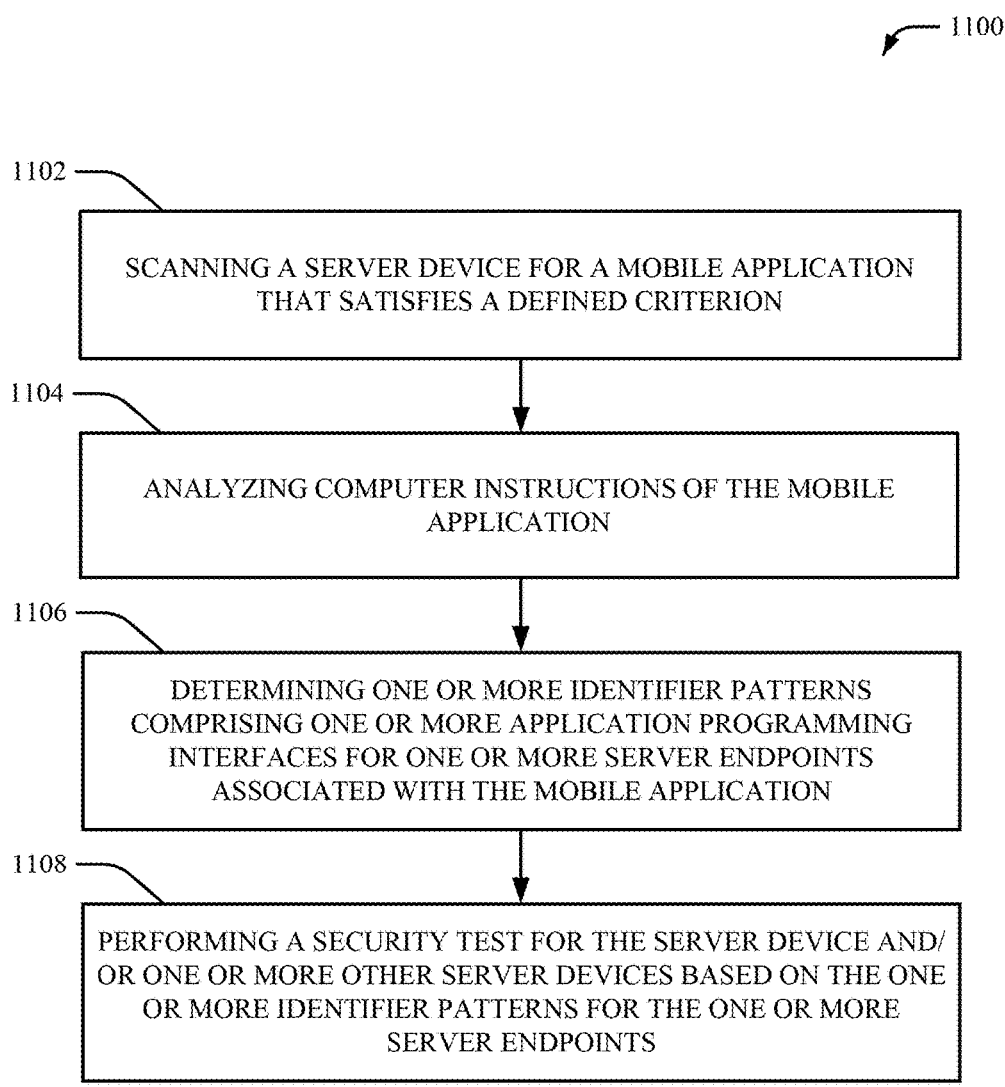
FIG. 11 illustrates a flow diagram of an example, non-limiting computer-implemented method that performs scanning of a server to facilitate automated security testing in accordance with one or more embodiments described herein.

FIG. 11 illustrates a flow diagram of an example, non-limiting computer-implemented method 1100 that performs scanning of a server to facilitate automated security testing in accordance with one or more embodiments described herein. At 1102, a server device is scanned (e.g., by scanning component 302) for a mobile application that satisfies a defined criterion. For example, the server device can be scanned for a mobile application that includes and/or is associated with a defined API. In another example, the server device can be scanned for a mobile application that communicates with the server device. Additionally or alternatively, the server device can be scanned for a mobile application that satisfies a defined criterion associated with an amount of time that a mobile application is stored on the server device, a change that occurs with respect to a mobile application (e.g., a mobile application is updated to a new version), an amount of time since a previous analysis of a mobile application, an indication provided by user input that indicates to analyze a mobile application, a debugging report for a mobile application, etc. At 1104, computer instructions of the mobile application are analyzed (e.g., by analysis component 104). At 1106, one or more identifier patterns comprising one or more application programming interfaces for one or more server endpoints associated with the mobile application are determined (e.g., by analysis component 104). At 1108, a security test for the server device and/or one or more other server devices is performed (e.g., by security component 106) based on the one or more identifier patterns for the one or more server endpoints.

Figure 12:
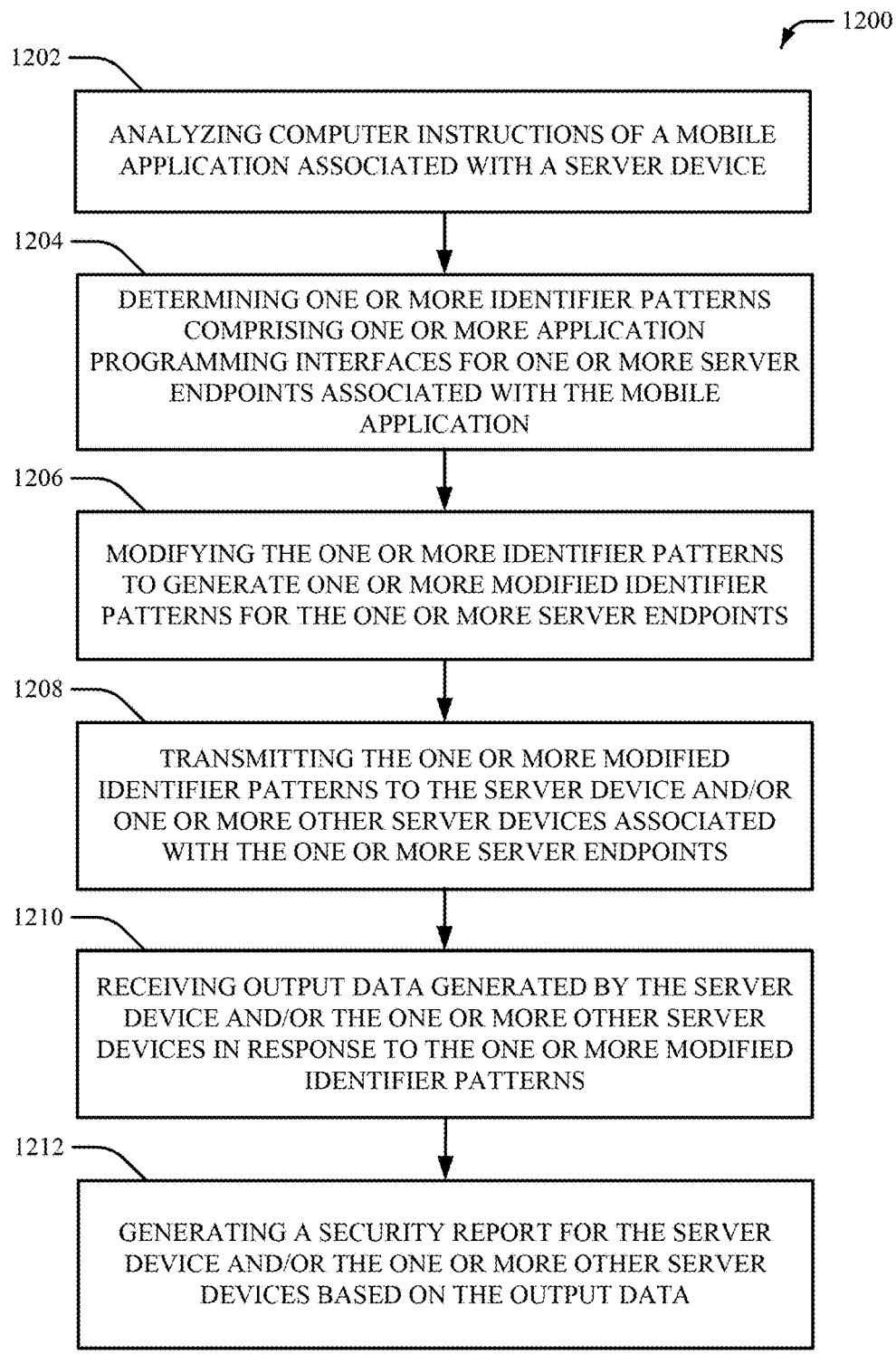
FIG. 12 illustrates a flow diagram of an example, non-limiting computer-implemented method that performs automated security testing in accordance with one or more embodiments described herein.

FIG. 12 illustrates a flow diagram of an example, non-limiting computer-implemented method 1200 that performs automated security testing in accordance with one or more embodiments described herein. At 1202, computer instructions of a mobile application associated with a server device are analyzed (e.g., by analysis component 104). At 1204, one or more identifier patterns comprising one or more application programming interfaces for one or more server endpoints associated with the mobile application are determined (e.g., by analysis component 104).

At 1206, the one or more identifier patterns are modified (e.g., by security component 106) to generate one or more modified identifier patterns for the one or more server endpoints. In an aspect, an identifier pattern from the one or more identifier patterns can be modified by adding a payload to the identifier pattern. For example, a payload can be added to the identifier pattern by augmenting the identifier pattern with the payload. In another example, a payload can be added to the identifier pattern by replacing a portion of the identifier pattern with the payload. In another aspect, an identifier pattern from the one or more identifier patterns can be modified by removing a portion of the identifier pattern.

At 1208, the one or more modified identifier patterns are transmitted (e.g., by security component 106) to the server device and/or one or more other server devices associated with the one or more server endpoints. For example, the one or more modified identifier patterns can be transmitted to server device and/or one or more other server devices via a network (e.g., one or more wireless networks and/or one or more wired networks). In an aspect, the one or more modified identifier patterns can be transmitted to the server device and/or one or more other server devices via one or more data packets (e.g., one or more encoded data packets).

At 1210, output data generated by the server device and/or the one or more other server devices is received (e.g., by security component 106) in response to the one or more modified identifier patterns. For example, the output data can be generated by the server device and/or the one or more other server devices in response to processing the one or more modified identifier patterns. In an aspect, the output data can be received via a network (e.g., one or more wireless networks and/or one or more wired networks). Furthermore, the output data can be received via one or more data packets (e.g., one or more encoded data packets).

At 1212, a security report for the server device and/or the one or more other server devices is generated (e.g., by security component 106) based on the output data. For example, the security report can include information regarding one or more security weaknesses and/or likelihood of a cyber attack with respect to the server device and/or the one or more other server devices. The security report can be in a human-readable format. In an embodiment, the security report can be formatted for rendering via a user interface associated with a display of a display device such as a mobile electronic device, a monitor, a web browser or the like.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because at least analysis of computer instructions associated with a mobile application and/or a security test associated with a server device are established from a combination of electrical and mechanical components and circuitry, a human is unable to replicate or perform analysis performed by the analysis component 104 and/or a security test performed by the security component 106. For example, a human is unable to analyze computer instructions (e.g., bytecode) during a static analysis process. Furthermore, a human is unable to communicate data and/or packetized data associated with a security test between a testing component (e.g., testing component 102) and a server device (e.g., server device 112).

Figure 13:
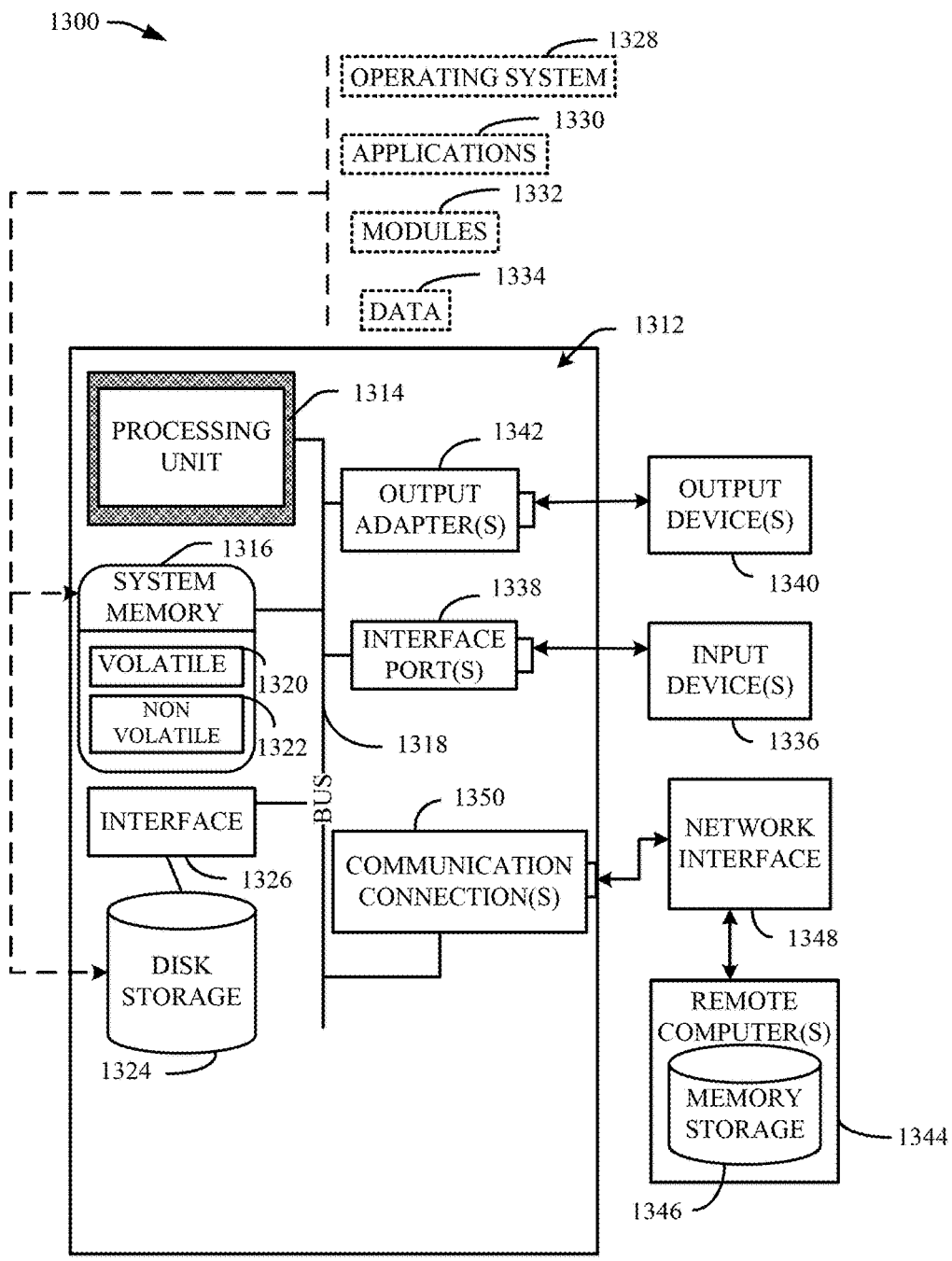
FIG. 13 illustrates a block diagram of an example, non-limiting operating environment in which one or more embodiments described herein can be facilitated.

In order to provide a context for the various aspects of the disclosed subject matter, FIG. 13 as well as the following discussion are intended to provide a general description of a suitable environment in which the various aspects of the disclosed subject matter can be implemented. FIG. 13 illustrates a block diagram of an example, non-limiting operating environment in which one or more embodiments described herein can be facilitated. Repetitive description of like elements employed in other embodiments described herein is omitted for sake of brevity.

With reference to FIG. 13, a suitable operating environment 1300 for implementing various aspects of this disclosure can also include a computer 1312. The computer 1312 can also include a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314. The system bus 1318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1316 can also include volatile memory 1320 and nonvolatile memory 1322. The basic input/output system (BIOS), containing the basic routines to transfer information between elements within the computer 1312, such as during start-up, is stored in nonvolatile memory 1322. Computer 1312 can also include removable/non-removable, volatile/non-volatile computer storage media. FIG. 13 illustrates, for example, a disk storage 1324. Disk storage 1324 can also include, but is not limited to, devices like a magnetic disk drive, floppy disk drive, tape drive, Jaz drive, Zip drive, LS-100 drive, flash memory card, or memory stick. The disk storage 1324 also can include storage media separately or in combination with other storage media. To facilitate connection of the disk storage 1324 to the system bus 1318, a removable or non-removable interface is typically used, such as interface 1326. FIG. 13 also depicts software that acts as an intermediary between users and the basic computer resources described in the suitable operating environment 1300. Such software can also include, for example, an operating system 1328. Operating system 1328, which can be stored on disk storage 1324, acts to control and allocate resources of the computer 1312.

System applications 1330 take advantage of the management of resources by operating system 1328 through program modules 1332 and program data 1334, e.g., stored either in system memory 1316 or on disk storage 1324. It is to be appreciated that this disclosure can be implemented with various operating systems or combinations of operating systems. A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port can be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a computer, a server, a router, a network PC, a workstation, a microprocessor based appliance, a peer device or other common network node and the like, and typically can also include many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1350 refers to the hardware/software employed to connect the network interface 1348 to the system bus 1318. While communication connection 1350 is shown for illustrative clarity inside computer 1312, it can also be external to computer 1312. The hardware/software for connection to the network interface 1348 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components;
a processor that executes computer executable components stored in the memory, wherein the computer executable components comprise:
an analysis component that:
analyzes computer-executable bytecode of a mobile application without executing the mobile application, and
based on the analysis, determines an identifier pattern comprising an application programming interface for one or more server endpoints associated with the mobile application, wherein the application programming interface is separate from the mobile application; and
a security component that:
performs a security test of the application programming interface executing on a server device based on the identifier pattern for the one or more server endpoints by transmitting one or more commands to the application programming interface over a communication network, wherein the security test is a penetration test of the application programming interface, and
generates a user interface that presents information regarding security weaknesses of the application programming interface on the server device.

2. The system of claim 1, wherein the analysis component performs intra-procedural analysis of the mobile application by individually analyzing a set of procedures associated with the computer instructions.

3. The system of claim 1, wherein the analysis component performs inter-procedural analysis of the mobile application by analyzing interactions between a set of procedures associated with the computer instructions.

4. The system of claim 1, wherein the analysis component identifies information from a group consisting of an Internet protocol address, a hostname, a network path, one or more parameters, a set of web domains, a set of web pages, a set of web addresses, and textual data associated with the one or more server endpoints.

5. The system of claim 1, wherein the analysis component stores the identifier pattern for the one or more server endpoints in a database with at least other identifier pattern for one or more other server endpoints associated with the mobile application.

6. The system of claim 1, wherein the security component transmits the one or more commands comprising a modified version of the identifier pattern to the server device.

7. The system of claim 6, wherein the security component transmits the one or more commands further comprising authentication data to the server device.

8. The system of claim 6, wherein the security component determines output data generated by the server device based on the modified version of the identifier pattern.

9. The system of claim 8, wherein the security component generates a security report for the server device in a human-readable format based on the output data.

10. The system of claim 1, wherein the security test for the server device facilitates improved detection of a security vulnerability associated with the server device.

11. A computer-implemented method, comprising:
receiving, by a system operatively coupled to a processor, a mobile application;
analyzing, by the system, computer-executable bytecode of the mobile application without executing the mobile application;
determining, by the system based on the analysis, one or more identifier patterns comprising one or more application programming interfaces for one or more server endpoints associated with the mobile application, wherein the one or more application programming interfaces are separate from the mobile application;
performing, by the system, a security test of the one or more application programming interfaces executing on a server device based on the one or more identifier patterns for the one or more server endpoints by transmitting one or more commands to the one or more application programming interfaces over a communication network, wherein the security test is a penetration test of the application programming interface, and
generating, by the system, a user interface that presents information regarding security weaknesses of the one or more application programming interfaces on the server device.

12. The computer-implemented method of claim 11, wherein the performing the security test comprises modifying the one or more identifier patterns to generate one or more modified identifier patterns for the one or more server endpoints.

13. The computer-implemented method of claim 12, further comprising:

transmitting, by the system, the one or more commands comprising the one or more modified identifier patterns to the server device; and
receiving, by the system, output data generated by the server device in response to the one or more modified identifier patterns.

14. The computer-implemented method of claim 12, wherein the modifying comprises adding a payload to the one or more identifier patterns.

15. The computer-implemented method of claim 12, wherein the modifying comprises removing a portion of the one or more identifier patterns.

16. A computer program product for performing automated security testing of a backend server, the computer program product comprising a computer readable storage medium having program instructions embodied therewith, the program instructions executable by a processor to cause the processor to:
analyze computer-executable bytecode of a mobile application without executing the mobile application;
determine, based on the analysis, an identifier pattern comprising an application programming interface for one or more server endpoints associated with the mobile application, wherein the application programming interface is separate from the mobile application;
modify the identifier pattern to generate a modified identifier pattern for the one or more server endpoints;
perform a security test of the application programming interface on a server device based on the modified identifier pattern for the one or more server endpoints by transmitting one or more commands to the application programming interface over a communication network, wherein the security test is a penetration test of the application programming interface; and
generate a user interface that presents information regarding security weaknesses of the application programming interface on the server device.

17. The computer program product of claim 16, wherein the program instructions are further executable by the processor to cause the processor to:
augment the identifier pattern with a payload to generate the modified identifier pattern.

18. The computer program product of claim 16, wherein the program instructions are further executable by the processor to cause the processor to:
perform intra-procedural analysis of the mobile application by individually analyzing a set of procedures associated with the computer instructions.

19. The computer program product of claim 16, wherein the program instructions are further executable by the processor to cause the processor to:
perform inter-procedural analysis of the mobile application by analyzing interactions between a set of procedures associated with the computer instructions.

* * * * *